US010995877B2

(12) United States Patent
Ito

(10) Patent No.: US 10,995,877 B2
(45) Date of Patent: May 4, 2021

(54) FLUID VALVE AND OPENING MOTION PROMOTING DEVICE

(71) Applicant: NABTESCO CORPORATION, Tokyo (JP)

(72) Inventor: Koji Ito, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 1 day.

(21) Appl. No.: 16/225,274

(22) Filed: Dec. 19, 2018

(65) Prior Publication Data

US 2019/0195384 A1 Jun. 27, 2019

(30) Foreign Application Priority Data

Dec. 25, 2017 (JP) .............................. JP2017-247804

(51) Int. Cl.
| | |
|---|---|
| *F16K 31/122* | (2006.01) |
| *F16K 3/26* | (2006.01) |
| *F16K 3/24* | (2006.01) |
| *F16K 1/42* | (2006.01) |
| *F16K 1/36* | (2006.01) |
| *F15B 1/00* | (2006.01) |
| *F15B 13/02* | (2006.01) |
| *F16K 31/04* | (2006.01) |
| *F16K 47/04* | (2006.01) |

(52) U.S. Cl.
CPC ............ *F16K 31/1221* (2013.01); *F15B 1/00* (2013.01); *F15B 13/02* (2013.01); *F16K 1/36* (2013.01); *F16K 1/42* (2013.01); *F16K 3/243* (2013.01); *F16K 3/26* (2013.01); *F16K 31/041* (2013.01); *F16K 47/045* (2013.01)

(58) Field of Classification Search
CPC .......... F16K 31/1221; F16K 1/36; F16K 1/42; F16K 3/243; F16K 3/26; F16K 31/041; F16K 47/045; F16K 31/021; F15B 1/00; F15B 13/02; F15B 2211/5154; F15B 2211/50518; F15B 2211/50563; F15B 2211/3058; F15B 2211/50527; Y10T 137/7731; Y10T 137/7779
USPC ............................................... 137/493, 493.8
See application file for complete search history.

(56) References Cited

U.S. PATENT DOCUMENTS 3,194,261 A * 7/1965 Tennis ..................... F15B 13/02
137/491
3,792,715 A * 2/1974 Parrett ..................... F15B 13/01
137/493

(Continued)

FOREIGN PATENT DOCUMENTS

JP 2016-070450 A 5/2016

*Primary Examiner* — William M McCalister
(74) *Attorney, Agent, or Firm* — Pillsbury Winthrop Shaw Pittman, LLP

(57) ABSTRACT

A fluid valve has a valve plug configured as follows. In order to control a flow rate of a fluid between a first pressure chamber and a second pressure chamber, the valve plug is provided so as to be openable and closable in accordance with a difference between forces generated by pressures in the pressure chambers and resilience of an elastic member. The fluid valve includes an opening motion promoting portion. The opening motion promoting portion promotes an increase in degree of opening of the valve plug after the valve plug has been opened.

8 Claims, 14 Drawing Sheets

(56) References Cited

U.S. PATENT DOCUMENTS

| | | | | |
|---|---|---|---|---|
| 4,433,615 A | * | 2/1984 | Vick | F15B 13/01 |
| | | | | 137/106 |
| 5,174,189 A | * | 12/1992 | Kamimura | F15B 13/01 |
| | | | | 91/446 |
| 10,088,066 B2 | * | 10/2018 | Ito | F15B 13/027 |

* cited by examiner

FLUID VALVE AND OPENING MOTION PROMOTING DEVICE

CROSS-REFERENCE TO RELATED APPLICATIONS

This application is based on and claims the benefit of priority from Japanese Patent Application Serial No. 2017-247804 (filed on Dec. 25, 2017), the contents of which are hereby incorporated by reference in their entirety.

TECHNICAL FIELD

The present invention relates to a fluid valve for adjusting a pressure of a fluid and an opening motion promoting device for a valve plug provided in the fluid valve.

BACKGROUND

There is known a technique described in Japanese Laid-Open Patent Publication No. 2016-70450 ("the '450 Publication") and related to a hydraulic valve that is a type of fluid valve for controlling a fluid pressure such as a hydraulic pressure, a pneumatic pressure, or a water pressure in a particular pressure chamber.

The hydraulic valve has two pressure chambers, each of which includes a port connected to a hydraulic device. The two pressure chambers are partitioned from each other with an opening/closing portion composed of a valve plug and a valve seat. The valve plug and the valve seat move relative to each other, and when the valve plug and the valve seat are separated from each other to form a gap therebetween, the two pressure chambers are connected to each other. When a difference (a pressure difference) between a pressure in one of the pressure chambers and a pressure in the other pressure chamber becomes equal to or higher than a preset value, the two pressure chambers are connected to each other, and thus the pressure difference is eliminated.

SUMMARY

In this type of fluid valve, when the two pressure chambers are connected to each other, the valve plug might be opened only to an insufficient degree. In such a case, a flow of a fluid is restricted, so that the fluid flows at a decreased velocity from one of the pressure chambers to the other pressure chamber, and thus it takes time to eliminate a pressure difference. It is an object of the present invention to provide a fluid valve and an opening motion promoting device that are capable of promptly eliminating a pressure difference.

(1) A fluid valve for solving the above-described problem is a fluid valve including a valve plug provided so as to be openable and closable in accordance with a difference between forces generated by a pressure in the first pressure chamber and a pressure in the second pressure chamber and resilience of an elastic member, in order to control a flow rate of a fluid between a first pressure chamber and a second pressure chamber. The fluid valve includes an opening motion promoting portion for promoting an increase in degree of opening of the valve plug after the valve plug has been opened.

(2) In the above-described fluid valve, the opening motion promoting portion may apply, to the valve plug, a force in an opening direction of the valve plug.

(3) In the above-described fluid valve, it is possible that the valve plug includes a circulation path connecting the first pressure chamber to the second pressure chamber and configured to be closed by a valve seat, and the opening motion promoting portion includes a pressure reservoir for temporarily storing a fluid flowing into the circulation path of the valve plug so as to increase a pressure for pushing the valve plug.

(4) In the above-described fluid valve, there may be provided a flow rate adjusting portion for restricting a flow rate of the fluid in a flow path through which the fluid flows out of the pressure reservoir.

(5) In the above-described fluid valve, the flow rate adjusting portion may lower a pressure in the pressure reservoir by relaxing restriction on the flow rate as the valve plug is opened to a greater degree.

(6) In the above-described fluid valve, it is possible that each one of the valve plug and the valve seat is openable and closable with respect to the other, and when the fluid flows into the pressure reservoir from outside the pressure reservoir as the valve seat is opened, the fluid rate adjusting portion relaxes restriction on the flow rate in the flow path of the pressure reservoir.

(7) In the above-described fluid valve, it is possible that the pressure reservoir includes an inner wall for storing a fluid flowing from a pressure chamber near the valve seat into a pressure chamber near the valve plug, the inner wall including a circumferential wall surrounding at least part of the valve plug and a movable wall extending from the valve plug and disposed so as to overlap with the circumferential wall, and the flow rate adjusting portion is provided in at least one of the circumferential wall and the movable wall.

(8) In the above-described fluid valve, it is possible that the flow rate adjusting portion includes a first flow path connecting between the inside and outside of the pressure reservoir, and an amount of opening of the first flow path is increased through movement of the movable wall together with the valve plug as a pressure in the pressure reservoir rises.

(9) In the above-described fluid valve, it is possible that the first flow path is provided in at least one of the movable wall and the circumferential wall in a section in which the movable wall and the circumferential wall overlap with each other, and the amount of opening varies in accordance with relative movement between the movable wall and the circumferential wall.

(10) In the above-described fluid valve, it is possible that the flow rate adjusting portion includes the first flow path and a second flow path separate from the first flow path, the second flow path connecting between the inside and outside of the pressure reservoir, and before the valve seat is opened, an amount of opening of the second flow path is set to such an amount as to restrict a flow rate of a fluid flowing to the pressure reservoir, and after the valve seat has been opened, the amount of opening of the second flow path is increased so as to relax restriction on the flow rate of the fluid flowing to the pressure reservoir.

(11) In the above-described fluid valve, the amount of opening of the second flow path may be adjusted through movement of a moving body including the second flow path or through movement of a moving body closing at least part of the second flow path.

(12) In the above-described fluid valve, it is possible that the valve plug includes an iron core, and after the valve plug has been opened, the opening motion promoting portion generates a force by use of a coil disposed around the iron core, the force acting on the valve plug in the opening direction of the valve plug.

(13) It is possible that the above-described fluid valve further includes an actuator for causing the valve plug to move, and after the valve plug has been opened, the opening motion promoting portion generates a force by use of the actuator, the force acting on the valve plug in the opening direction of the valve plug.

(14) In the above-described fluid valve, the opening motion promoting portion may reduce an acting force of the elastic member, the acting force acting to close the valve plug.

(15) An opening motion promoting device for solving the above-described problem is an opening motion promoting device for promoting opening of a valve plug included in a fluid valve, the valve plug being provided so as to be openable and closable in accordance with a difference between forces generated by a pressure in a first pressure chamber and a pressure in a second pressure chamber and resilience of an elastic member, in order to control a flow rate of a fluid between the first pressure chamber and the second pressure chamber. The opening motion promoting device promotes an increase in degree of opening of the valve plug after the valve plug has been opened.

(16) In the above-described opening motion promoting device, after the valve plug has been opened, there may be generated a force acting on the valve plug in an opening direction of the valve plug.

Advantages

According to the fluid valve and the opening motion promoting device, it is possible to promptly eliminate a pressure difference between the first pressure chamber and the second pressure chamber.

DESCRIPTION OF THE PREFERRED EMBODIMENTS

Figure 1:
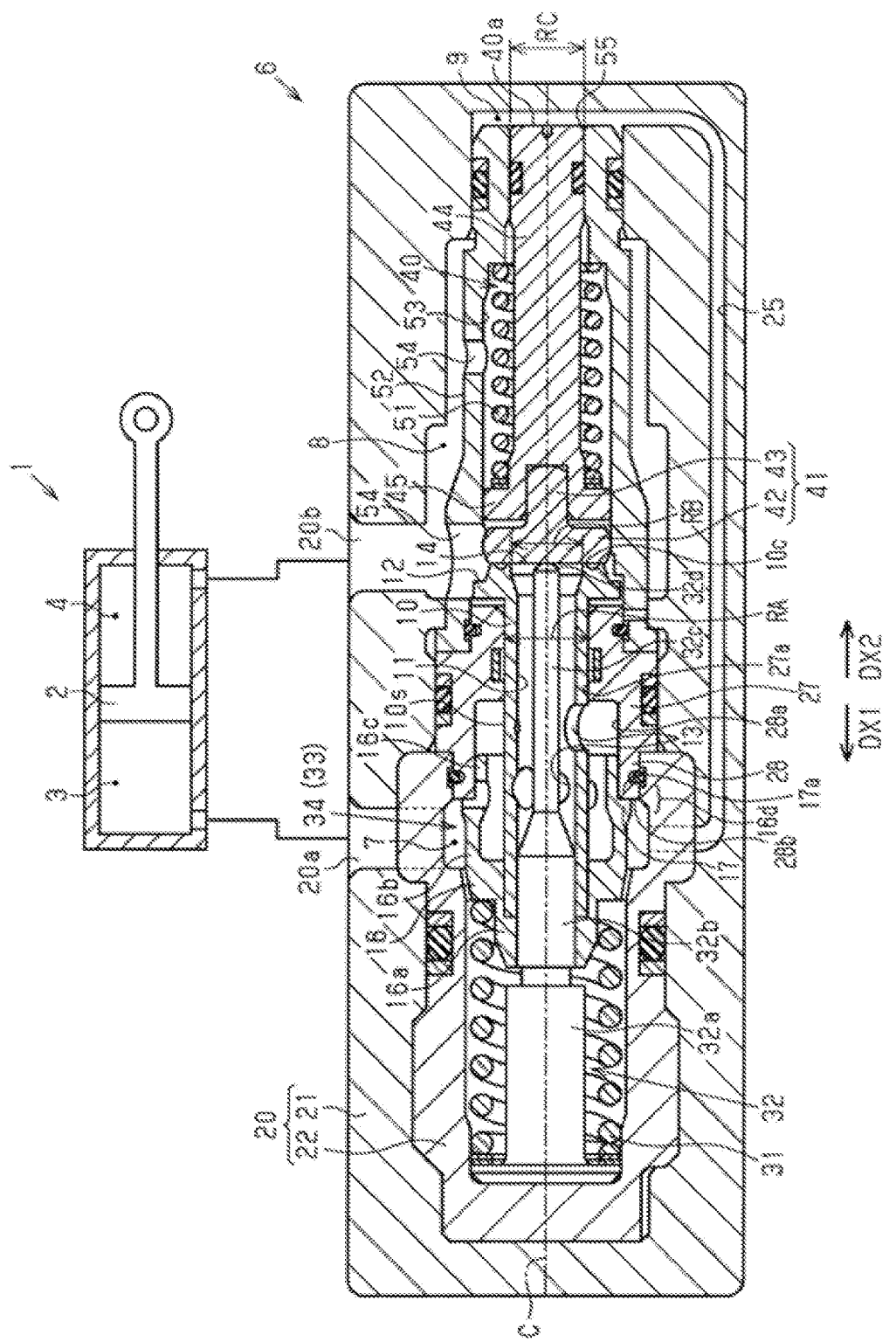
FIG. 1 is a sectional view of a fluid valve according to a first embodiment.

<First Embodiment> With reference to FIG. 1 to FIG. 4, a description is given of a fluid valve according to a first embodiment.

A fluid valve 6 is mounted to a drive apparatus 1 for driving a piston 2 based on a fluid pressure. The drive apparatus 1 includes two pressure chambers 3 and 4 partitioned from each other with the piston 2. The fluid valve 6 is mounted to the drive apparatus 1 so as to connect the two pressure chambers 3 and 4 outside the drive apparatus 1. Further, the fluid valve 6 controls a flow rate in a bypass connecting between the two pressure chambers 3 and 4 so as to adjust a pressure in each of the pressure chambers 3 and 4.

For example, when a pressure in the pressure chamber 3, which is one of the pressure chambers 3 and 4, is larger than a pressure in the pressure chamber 4, which is the other of the pressure chambers 3 and 4, and a pressure difference therebetween exceeds a set value, the fluid valve 6 allows a fluid to circulate from the one pressure chamber 3 to the other pressure chamber 4. That is, the fluid valve 6 controls circulation of a fluid between the two pressure chambers 3 and 4 based on a difference in pressure between the two pressure chambers 3 and 4.

The fluid valve 6 is applicable to all of a drive apparatus configured to operate using a hydraulic pressure, a drive apparatus configured to operate using a pneumatic pressure, and a drive apparatus configured to operate using a water pressure. This embodiment describes the fluid valve 6 mounted to a hydraulic drive apparatus configured to operate using a hydraulic pressure. One example of the hydraulic drive apparatus is a hydraulic apparatus for driving a spoiler of an aircraft, an actuator configured to operate using a hydraulic pressure, or the like.

With reference to FIG. 1, a description is given of a structure of the fluid valve 6. In the fluid valve 6, a center axis C of a valve plug 10 agrees with respective center axes of other constituent elements (for example, a housing 20, a valve seat 40, and so on). In the following description, for a component having a center axis agreeing with the center axis C of the valve plug 10, the center axis thereof is denoted by the same reference character "C" as that of the center axis C of the valve plug 10.

As shown in FIG. 1, the fluid valve 6 includes the valve plug 10 for controlling circulation of a fluid between two pressure chambers (hereinafter, one of them is referred to as a "first pressure chamber 7" and the other is referred to as a "second pressure chamber 8"). Moreover, the fluid valve 6 includes an after-mentioned opening motion promoting portion 33.

The valve plug 10 controls a flow rate of a fluid between the first pressure chamber 7 and the second pressure chamber 8 in the housing 20. The valve plug 10 is provided in the housing 20 so as to be openable and closable based on a difference in pressure generated by a pressure in the first pressure chamber 7 (hereinafter, a "first pressure") and a pressure in the second pressure chamber 8 (hereinafter, a "second pressure") and resilience of a first elastic member 31 (which will be mentioned later).

Being openable and closable means that valve opening and valve closing can be performed. "Valve opening" refers to a state where, in the fluid valve 6, a fluid can circulate between the first pressure chamber 7 and the second pressure chamber 8. In a state of "valve opening," the valve plug 10 is separated from the valve seat 40. "Valve closing" refers to a state where, in the fluid valve 6, a fluid does not circulate between the first pressure chamber 7 and the second pressure chamber 8. In a state of "valve closing," the valve plug 10 is in contact with the valve seat 40.

As shown in FIG. 1, the housing 20 has the first pressure chamber 7 and the second pressure chamber 8. A direction from the second pressure chamber 8 toward the first pressure chamber 7 is referred to as a "first direction DX1," and a direction opposite to the first direction DX1 is referred to as a "second direction DX2."

The housing 20 includes a first housing 21 and a second housing 22 disposed inside the first housing 21. In the first housing 21, there is provided an internal space extending along a center axis C of the housing 20. Inside the first housing 21, a partition wall 27 dividing the internal space into two chambers is provided at a middle portion of the center axis C. In the internal space, in one of the chambers partitioned from each other with the partition wall 27, the second housing 22 is disposed so as to be tightly attached to an inner surface of the first housing 21. The first pressure chamber 7 is provided in the second housing 22. The other of the chambers partitioned from each other with the partition wall 27 constitutes the second pressure chamber 8.

The housing 20 has a first port 20a provided so as to be connected to the first pressure chamber 7. The housing 20 also has a second port 20b provided so as to be connected to the second pressure chamber 8. The first port 20a and the second port 20b are connected respectively to the pressure chambers 3 and 4 in the drive apparatus 1 to be controlled by the fluid valve 6.

The partition wall 27 has a through hole 27a provided to extend along the center axis C of the housing 20. The valve plug 10 is inserted into the through hole 27a. The valve plug 10 is inserted through the through hole 27a so as to prevent a fluid from circulating between the valve plug 10 and the through hole 27a of the partition wall 27. The valve plug 10 slides with respect to the partition wall 27. The valve plug 10 moves along the center axis C of the housing 20. The valve plug 10 is movable in the first direction DX1 and in the second direction DX2.

Furthermore, the partition wall 27 has, in a section thereof in the first direction DX1, a circumferential wall 28 provided so as to surround the valve plug 10. In a radial direction orthogonal to the center axis C, a space is configured between the valve plug 10 and the circumferential wall 28. The circumferential wall 28 has an inner circumferential surface 28a in a circular cylindrical shape about the center axis C of the housing 20. Moreover, the circumferential wall 28 of the partition wall 27 has, near the first pressure chamber 7, an end surface 28b perpendicular to the center axis C of the housing 20.

The first pressure chamber 7 houses a first elastic member 31 biasing the valve plug 10 in the second direction DX2, a restriction member 32 restricting movement of the valve seat 40 in the first direction DX1, and the opening motion promoting portion 33 for promoting an increase in degree of opening of the valve plug 10 (which will be mentioned later) after the valve plug 10 has been opened.

The second pressure chamber 8 houses the valve seat 40, a second elastic member 51 biasing the valve seat 40 in the first direction DX1, and a support member 52 supporting the valve seat 40 and the second elastic member 51. The following describes respective configurations of these components.

The valve plug 10 is disposed so as to bridge both of the first pressure chamber 7 and the second pressure chamber 8. The valve plug 10 has a body portion 10a (see FIG. 3) extending through the through hole 27a of the partition wall 27 and a head portion 10b provided at an end of the body portion 10a in the second direction DX2. The valve plug 10 has a hole through which a fluid circulates (hereinafter, referred to as a "circulation path 11"). In the valve plug 10, the circulation path 11 extends along the center axis C of the housing 20. The circulation path 11 connects the first pressure chamber 7 to the second pressure chamber 8. The circulation path 11 allows a fluid to circulate between the first pressure chamber 7 and the second pressure chamber 8. In the circulation path 11 of the valve plug 10, an opening end at an end thereof near the second pressure chamber 8 is referred to hereinafter as an "opening portion 14." The opening portion 14 can be closed by the valve seat 40.

An annular contact surface 10c is provided around the opening portion 14 in the valve plug 10 so as to contact with the valve seat 40. Furthermore, in the valve plug 10, a flange 12 is provided around the contact surface 10c. The circulation path 11 has a cross section perpendicular to the center axis C of the housing 20, which is circular about the circular axis C. In a vicinity of an end portion of the circulation path 11 in the second direction DX2, the cross section of the circulation path 11 increases in diameter toward the second direction DX2. A diameter RB (see FIG. 3) of the valve plug 10 at the opening portion 14 is smaller than a diameter RA of the valve plug 10 at the body portion 10a.

Furthermore, the valve plug 10 has a through hole 13 provided to extend in a direction intersecting with the center axis C of the housing 20. In the valve plug 10, the through hole 13 is provided in a section near the first pressure chamber 7. The through hole 13 is, on an outer side in the radial direction, open on an outer circumferential surface 10s of the valve plug 10 and, on an inner side in the radial direction, open to the circulation path 11. The through hole 13 connects the first pressure chamber 7 to the circulation path 11 of the valve plug 10.

The restriction member 32 extends along the center axis C of the housing 20 through the circulation path 11 of the valve plug 10 from the first pressure chamber 7 to the second pressure chamber 8. The restriction member 32 includes a base portion 32a, a first extension portion 32b, a second extension portion 32c, and a distal end portion 32d.

The base portion 32a constitutes a section of the restriction member 32 in the first direction DX1 and is fixed to the housing 20. The first extension portion 32b extends in the second direction DX2 from the base portion 32a. The first extension portion 32b slidably supports the valve plug 10 and a movable wall 16. The second extension portion 32c extends in the second direction DX2 from the first extension portion 32b. The first extension portion 32b and the second extension portion 32c extend through the circulation path 11 of the valve plug 10. The second extension portion 32c is thinner than the first extension portion 32b. The second extension portion 32c has a diameter (a diameter in a cross section perpendicular to the center axis C) set so as not to interfere with a flow of a fluid in the circulation path 11. The distal end portion 32d is configured in a distal section of the second extension portion 32c. The distal end portion 32d is disposed in the second pressure chamber 8.

As mentioned above, the opening motion promoting portion 33 promotes an increase in degree of opening of the valve plug 10 after the valve plug 10 has been opened. The opening motion promoting portion 33 applies, to the valve plug 10, a force with which the valve plug 10 is opened in the first direction DX1. Thus, the opening motion promoting portion 33 promotes an increase in degree of opening of the valve plug 10 after the valve plug 10 has been opened.

In this embodiment, based on a pressure of a fluid flowing from the second pressure chamber 8 into the circulation path 11, the opening motion promoting portion 33 forms a force with which the valve plug 10 is opened in the first direction DX1. Specifically, the opening motion promoting portion 33 has a pressure reservoir 34 for temporarily storing a fluid flowing into the circulation path 11 of the valve plug 10 so as to increase a pressure for pushing the valve plug 10. The pressure reservoir 34 is provided on a flow path of a fluid from the first port 20a to the circulation path 11 of the valve plug 10. The pressure reservoir 34 is configured as a wall for blocking a flow of a fluid so that the fluid is accumulated. Specifically, the pressure reservoir 34 includes an inner wall 35. The inner wall 35 temporarily stores a fluid flowing from the second pressure chamber 8 near the valve seat 40 into the first pressure chamber 7 near the valve plug 10. The inner wall 35 is provided in the first pressure chamber 7 and surrounds a periphery of the through hole 13 of the valve plug 10.

The inner wall 35 includes the circumferential wall 28 and the movable wall 16 mentioned above. The movable wall 16 is configured to extend from an end portion of the valve plug 10 in the first direction DX1 to the second direction DX2. The movable wall 16 moves integrally with the valve plug 10. In a direction along the center axis C, the movable wall 16 is disposed on a first direction DX1 side of the circumferential wall 28. Further, the movable wall 16 is disposed so as to overlap with the circumferential wall 28. In this manner, the inner wall 35 surrounds an outer circumference of the valve plug 10. That is, a space S in the pressure reservoir 34 is surrounded by the circumferential wall 28, the valve plug 10, and the movable wall 16.

Specifically, the movable wall 16 has a base portion 16a connected to the valve plug 10, an extension portion 16b extending in the second direction DX2 from the base portion 16a, and an overlapping portion 16c extending further in the second direction DX2 from the extension portion 16b and overlapping with the circumferential wall 28. When the movable wall 16 moves, the overlapping portion 16c comes into sliding contact with the inner circumferential surface 28a of the circumferential wall 28.

In the movable wall 16, a step portion 17 is provided at a boundary between the extension portion 16b and the overlapping portion 16c. The step portion 17 has a surface (hereinafter, a "restriction surface 17a") for restricting movement of the movable wall 16 and the valve plug 10. The restriction surface 17a is opposed to the end surface 28b of the partition wall 27. When the valve plug 10 moves in the second direction DX2, the restriction surface 17a of the movable wall 16 moving integrally with the valve plug 10 contacts with the end surface 28b of the partition wall 27. In this manner, movement of the valve plug 10 is restricted at a predetermined position (hereinafter, referred to as a "first restriction position") in the second direction DX2.

Moreover, a flow rate adjusting portion 36 is provided in the pressure reservoir 34. The flow rate adjusting portion 36 restricts a flow rate of a fluid in a flow path (a first flow path 37) through which the fluid flows from inside to outside the pressure reservoir 34.

For example, the flow rate adjusting portion 36 includes the first flow path 37 connecting between the inside and outside of the pressure reservoir 34. An amount of opening of the first flow path 37 is increased through movement of the movable wall 16 together with the valve plug 10 as a pressure inside the pressure reservoir 34 becomes higher than a pressure outside the pressure reservoir 34. On the other hand, when a difference in pressure between a pressure inside the pressure reservoir 34 and a pressure outside the pressure reservoir 34 falls within a predetermined set range, the first flow path 37 restricts a fluid flowing from inside to outside the pressure reservoir 34.

The first flow path 37 is configured as a hole penetrating the movable wall 16. The first flow path 37 partially overlaps with the circumferential wall 28. An amount of opening of the first flow path 37 is increased/decreased depending on a degree of overlapping with the circumferential wall 28. Specifically, the first flow path 37 is provided at a boundary portion 16d between the extension portion 16b and the overlapping portion 16c in the movable wall 16. The first flow path 37 constitutes a flow path of a fluid flowing from inside to outside the pressure reservoir 34. The first flow path 37 is provided at at least one location in a circumferential direction around the center axis C of the housing 20. When the valve plug 10 is disposed at the first restriction position in the second direction DX2, part of the first flow path 37 enters the inside of the circumferential wall 28 in a direction along a center axis C direction. When the valve plug 10 moves in the first direction DX1 from the first restriction position, the first flow path 37 comes out of the circumferential wall 28 as the valve plug 10 moves, and thus a degree of overlapping between the first flow path 37 and the circumferential wall 28 is decreased, so that an amount of opening of the first flow path 37 is increased.

When an amount of opening of the first flow path 37 is small, a fluid flowing into the circulation path 11 through the opening portion 14 of the valve plug 10 causes a rise in pressure in the pressure reservoir 34. On the other hand, when an amount of opening of the first flow path 37 is large, a fluid flowing into the circulation path 11 through the opening portion 14 of the valve plug 10 does not cause an increase in pressure in the pressure reservoir 34.

The first elastic member 31 is disposed in the first direction DX1 with respect to the movable wall 16 and biases the movable wall 16 and the valve plug 10 in the second direction DX2. A force with which the first elastic member 31 pushes the movable wall 16 and the valve plug 10 is set so that, when a pressure difference between the first pressure and the second pressure falls within a set range, the valve plug 10 and the valve seat 40 are disposed at their respective equilibrium positions. The first elastic member 31 is, for example, a coil spring.

Next, a description is given of the valve seat 40. The valve seat 40 includes a lid body 41 for closing the opening portion 14 of the valve plug 10 and a support rod 44 supporting the lid body 41.

The lid body 41 has a lid main body portion 42 having a contacted surface 41a (see FIG. 3) for contacting with the contact surface 10c of the valve plug 10 and a protrusion portion 43 extending from the lid main body portion 42. When the lid body 41 contacts with the valve plug 10 to close the opening portion 14 of the valve plug 10, circulation of a fluid between the first pressure chamber 7 and the second pressure chamber 8 is blocked.

A support portion 45 supporting the lid body 41 is provided at an end portion of the support rod 44 in the first direction DX1. The support portion 45 supports the lid body 41. The contacted surface 41a of the lid body 41 is mounted to the support portion 45 so as to be inclinable within a predetermined range. Specifically, an angle between a center axis C of the lid body 41 and a center axis C of the support rod 44 is variable within a predetermined range. With this configuration, when the valve plug 10 and the valve seat 40 push against each other, the valve plug 10 contacts with the lid body 41 in a state where no gap is formed between the contact surface 10c of the valve plug 10 and the contacted surface 41a of the lid body 41.

When the valve plug 40 moves in the first direction DX1, the lid body 41 of the valve seat 40 contacts with the distal end portion 32d of the restriction member 32. In this manner, movement of the valve plug 40 in the first direction DX1 is restricted. Hereinafter, a position at which movement of the valve seat 40 in the first direction DX1 is restricted is referred to as a "second restriction position."

The support member 52 is disposed in the second pressure chamber 8 and fixed to the housing 20. The support member 52 has a housing portion 53 housing the valve seat 40. The housing portion 53 extends along the center axis C of the housing 20. The housing portion 53 penetrates the support member 52 along the center axis C. Furthermore, the support member 52 has a through hole 54 provided so as to intersect with the center axis C of the housing 20. A fluid circulates into the housing portion 53 through the through hole 54. The valve seat 40 slides with respect to the support member 52. An end surface 40a of the valve seat 40 in the second direction DX2 is exposed from an opening end 55 of the support member 52 in the second direction DX2.

The second elastic member 51 is disposed in a space between the support member 52 and the support rod 44 of the valve seat 40. The second elastic member 51 is, for example, a coil spring. The second elastic member 51 biases the valve seat 40 in the first direction DX1.

In the housing 20, there is provided a third pressure chamber 9 isolated from the second pressure chamber 8. The third pressure chamber 9 is configured as a space in which the end surface 40a of the valve seat 40 in the second direction DX2 is exposed. The third pressure chamber 9 is connected to the first pressure chamber 7 via a passage 25 provided in the housing 20. A pressure in the third pressure chamber 9 is equal to a pressure in the first pressure chamber 7 (the first pressure).

Next, a description is given of a force applied to the valve plug 10 and the valve seat 40 in a closed valve state.

The valve plug 10 receives a biasing force based on the first elastic member 31, the biasing force acting in the second direction DX2. Furthermore, the valve plug 10 receives a force in the first direction DX1 from the valve seat 40.

Furthermore, in the first pressure chamber 7, the valve plug 10 receives the first pressure based on a fluid in the first pressure chamber 7, thus being pushed in the second direction DX2. Moreover, in the second pressure chamber 8, the valve plug 10 receives the second pressure based on a fluid in the second pressure chamber 8, thus being pushed in the first direction DX1. Where an area difference between an area corresponding to the diameter RA of the body portion 10a of the valve plug 10 and an area corresponding to the diameter RB of the opening portion 14 of the valve plug 10 is defined as a "first differential area," a force corresponding to a difference between a force formed by applying the first pressure to the first differential area and a force formed by applying the second pressure to the first differential area is applied to the valve plug 10. Accordingly, when one of the first pressure and the second pressure becomes larger than the other, the valve plug 10 moves from the equilibrium position (which will be mentioned later).

The valve seat 40 receives a biasing force based on the second elastic member 51, the biasing force acting in the first direction DX1.

Furthermore, the valve seat 40 receives a force in the second direction DX2 from the valve plug 10. Furthermore, the valve seat 40 receives the first pressure from the circulation path 11 of the valve plug 10, thus being pushed in the second direction DX2. The valve seat 40 receives a pressure (equal to the first pressure) based on a fluid in the third pressure chamber 9, thus being pushed in the first direction DX1. Moreover, the valve seat 40 receives the second pressure based on a fluid in the second pressure chamber 8, thus being pushed in the first direction DX1. Where an area difference between an area corresponding to a diameter RC of the end surface 40a of the valve seat 40, the end surface 40a being exposed to the third pressure chamber 9, and an area corresponding to the diameter RB of the opening portion 14 of the valve plug 10 is defined as a "second differential area," a force corresponding to a difference between a force formed by applying the first pressure to the second differential area and a force formed by applying the second pressure to the second differential area is applied to the valve seat 40. Accordingly, when one of the first pressure and the second pressure becomes larger than the other, the valve seat 40 moves from the equilibrium position (which will be mentioned later).

When these forces applied respectively to the valve plug 10 and the valve seat 40 are in balance, in a state where the opening portion 14 of the valve plug 10 is closed by the lid body 41 of the valve seat 40, the valve plug 10 and the valve seat 40 are stopped from moving at their respective equilibrium positions (which will be mentioned later) (see FIG. 2).

Figure 2:
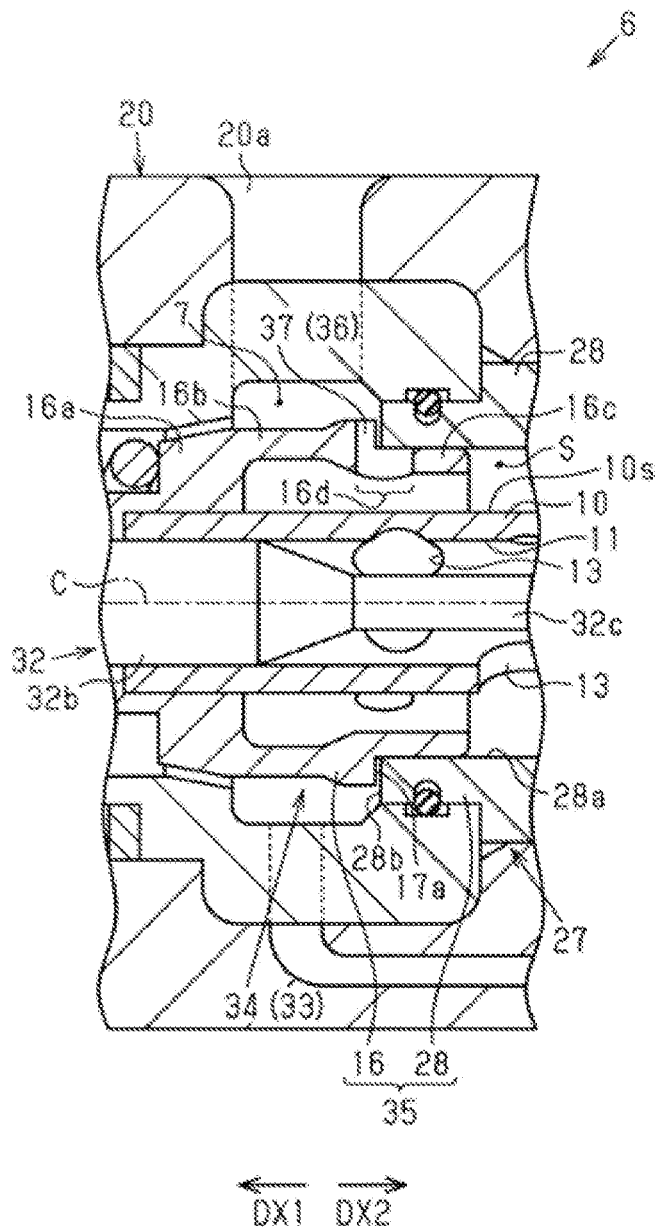
FIG. 2 is a partial sectional view of the fluid valve when closed in the first embodiment.
Figure 3:
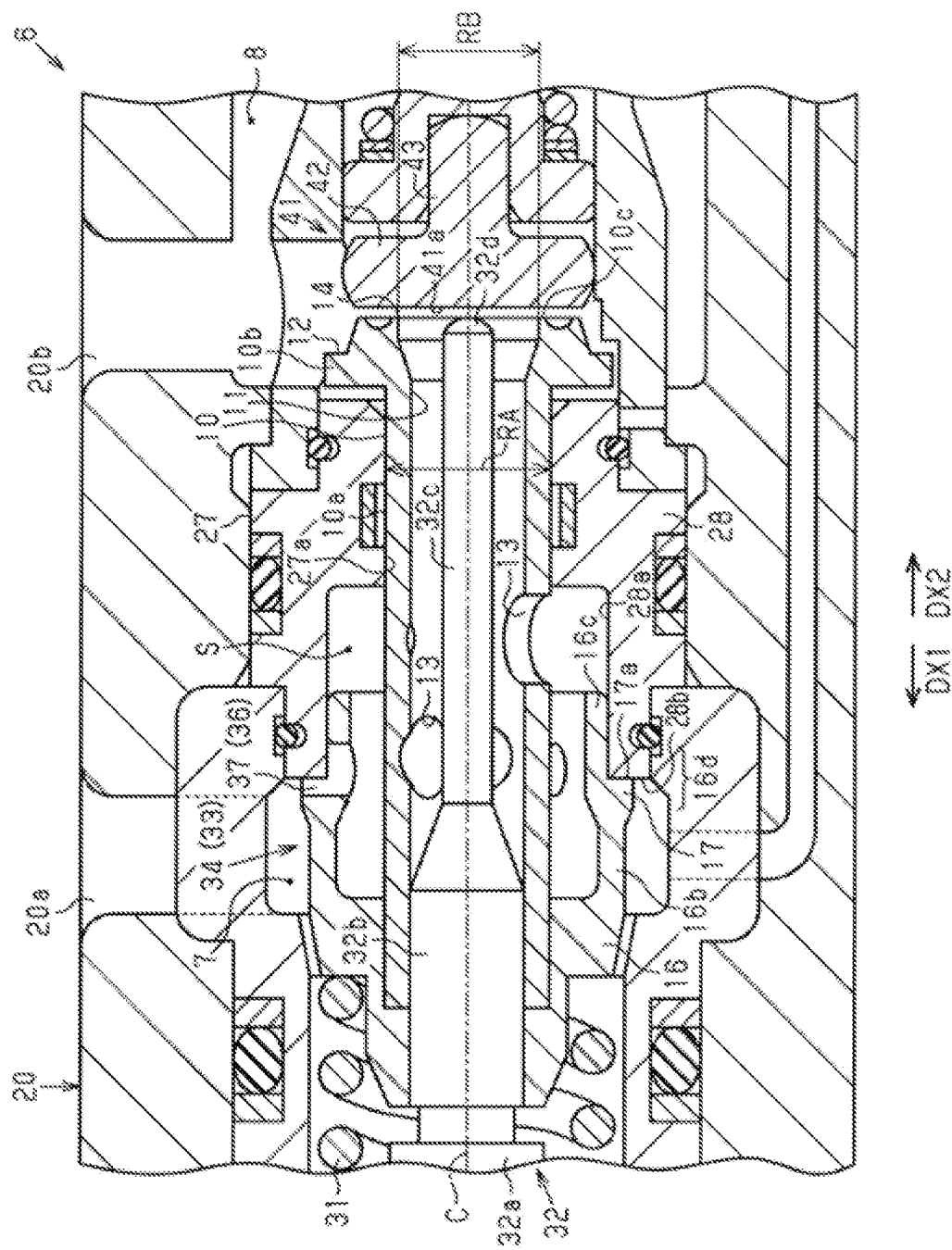
FIG. 3 is a partial sectional view of the fluid valve showing how the fluid valve is opened through movement of a valve seat in the first embodiment.
Figure 4:
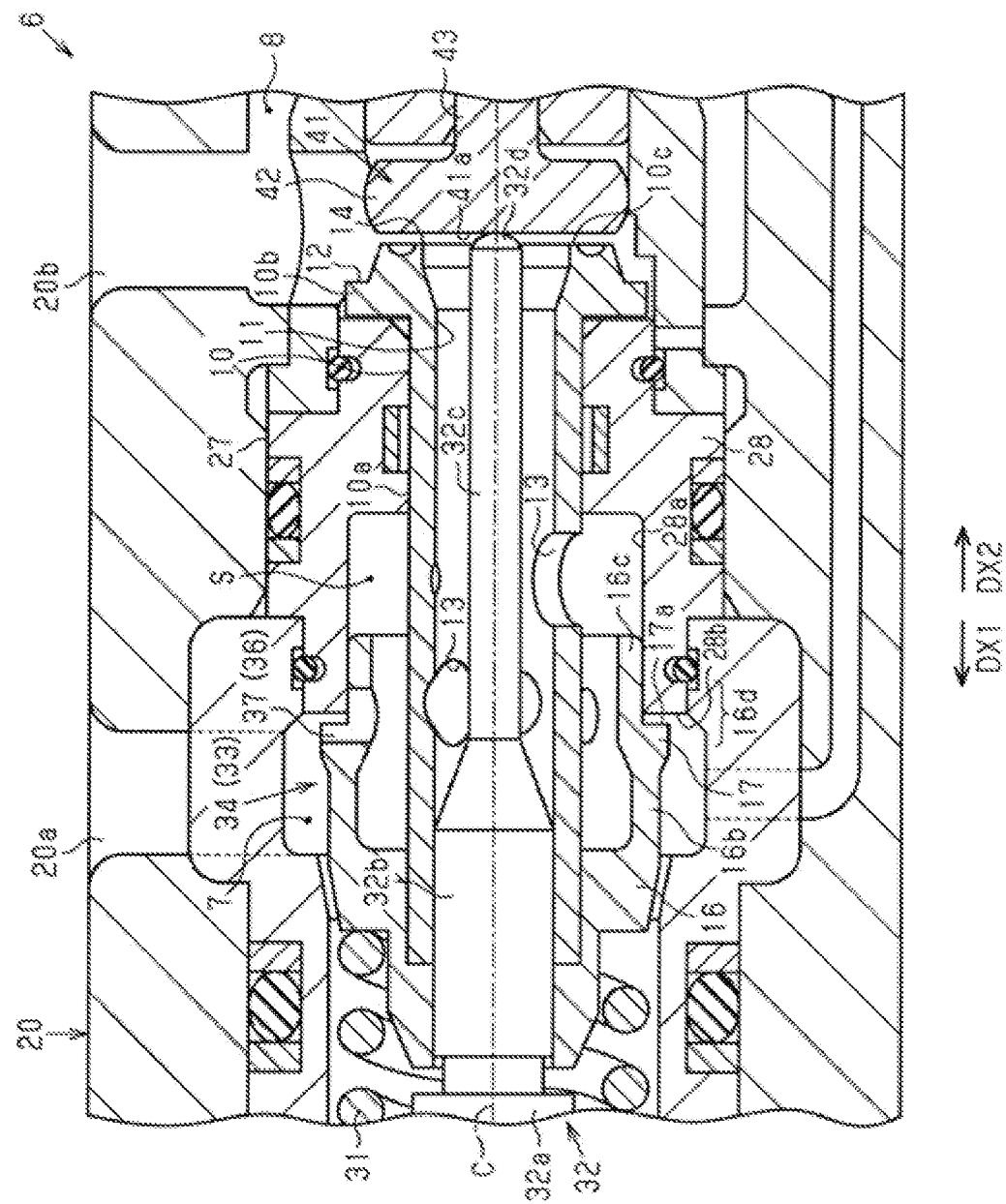
FIG. 4 is a partial sectional view of the fluid valve showing how the fluid valve is opened through movement of a valve plug in the first embodiment.
Figure 5:
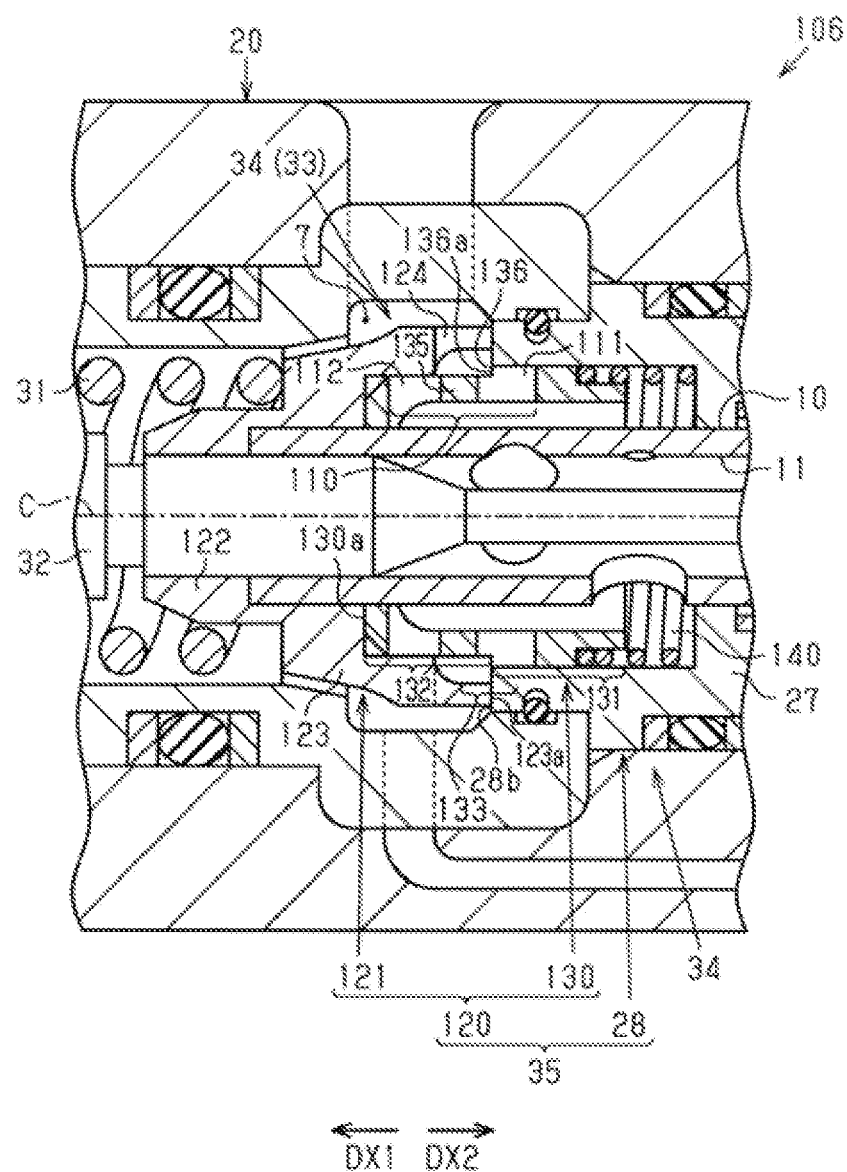
FIG. 5 is a partial sectional view of a fluid valve according to a second embodiment.

With reference to FIG. 2 to FIG. 4, a description is given of an operation of the fluid valve 6. FIG. 2 is a partial sectional view of the fluid valve 6 when closed.

When a pressure difference between the first pressure and the second pressure falls within a set range, the opening portion 14 of the valve plug 10 is closed by the lid body 41 of the valve seat 40. At this time, the restriction surface 17a of the movable wall 16 does not contact with the end surface 28b of the circumferential wall 28, and thus movement of the valve plug 10 is not restricted. Furthermore, the lid body 41 of the valve seat 40 does not contact with the restriction member 32, and thus movement of the valve seat 40 is not restricted. Therefore, the valve plug 10 and the valve seat 40 push against each other and thus are in a state of being movable in both the first direction DX1 and the second direction DX2. Respective positions of the valve plug 10 and the valve seat 40 along the center axis C of the housing 20 at this time are each referred to as the "equilibrium position."

FIG. 3 is a sectional view of the fluid valve 6 when opened through movement of the valve seat 40 in the second direction DX2. In this embodiment, valve opening caused by the valve seat 40 moving in the second direction DX2 is expressed as "the valve seat 40 is opened."

When the first pressure becomes larger than the second pressure and a pressure difference between the first pressure and the second pressure exceeds a first set value, the valve seat 40 moves in the second direction DX2 based on a change in pressure applied to the valve seat 40. When the valve seat 40 moves in the second direction DX2, a force in the first direction DX1 applied to the valve plug 10 via the valve seat 40 is reduced, and thus the valve plug 10 moves in the second direction DX2. That is, the valve plug 10 and the valve seat 40 move together in the second direction DX2. When the valve plug 10 moves over a first predetermined distance from the equilibrium position, the restriction surface 17a of the movable wall 16 contacts with the end surface 28b of the circumferential wall 28, and thus movement of the valve plug 10 is restricted. Movement of the valve seat 40 in the second direction DX2 is not restricted, and thus the valve seat 40 moves in the second direction DX2 over a longer distance than a moving distance of the valve plug 10. Thus, the opening portion 14 of the valve plug 10 is opened, and a fluid flows from the first pressure chamber 7 to the second pressure chamber 8, so that a difference in pressure is eliminated.

FIG. 4 is a sectional view of the fluid valve 6 when opened through movement of the valve plug 10 in the first direction DX1. In this embodiment, valve opening caused by the valve plug 10 moving in the first direction DX1 is expressed as "the valve plug 10 is opened."

When the second pressure becomes larger than the first pressure and a pressure difference between the first pressure and the second pressure exceeds a second set value, the valve plug 10 moves in the first direction DX1 based on a change in pressure applied to the valve plug 10, When the valve plug 10 moves in the first direction DX1, a force in the second direction DX2 applied to the valve seat 40 via the valve plug 10 is reduced, and thus the valve seat 40 moves in the first direction DX1. That is, the valve plug 10 and the valve seat 40 move together in the first direction DX1. When the valve seat 40 moves over a second predetermined distance from the equilibrium position, the lid body 41 contacts with the restriction member 32, and thus movement of the valve seat 40 is restricted. Movement of the valve plug 10 in the first direction DX1 is not restricted, and thus the valve plug 10 moves in the first direction DX1 over a longer distance than a moving distance of the valve seat 40. Thus, the opening portion 14 of the valve plug 10 is opened, and a fluid flows from the second pressure chamber 8 to the first pressure chamber 7, so that a difference in pressure is eliminated.

Regarding valve opening through movement of the valve plug 10 in the first direction DX1, a detailed description is further given in comparison with a fluid valve 6 having a comparative structure.

The fluid valve having the comparative structure is obtained by omitting the pressure reservoir 34 from the fluid valve 6 of this embodiment.

In the fluid valve having the comparative structure, when a lid body 41 of a valve seat 40 contacts with a restriction member 32 and thus opens an opening portion 14 of a valve plug 10, a fluid flows from a second pressure chamber 8 to a first pressure chamber 7 via a circulation path 11. Then, immediately after valve opening, a pressure in the first pressure chamber 7 is lowered, so that a pressure difference between a first pressure and a second pressure is decreased. As a result, a distance between the valve plug 10 and the valve seat 40 (hereinafter, this is referred to as a "degree of opening") is not increased, and thus a flow rate of a fluid flowing from the second pressure chamber 8 to the first pressure chamber 7 is not sufficiently increased. Consequently, it takes time to eliminate a difference in pressure between the first pressure and the second pressure. Furthermore, when the opening portion 14 of the valve plug 10 is closed in a state where a difference in pressure is not sufficiently eliminated, immediately after valve closing, a pressure difference between the first pressure and the second pressure exceeds the second set value, thus causing valve opening again. That is, fluid valve chattering (valve opening/closing occurs continuously in a short cycle) may occur.

The fluid valve 6 of this embodiment has the pressure reservoir 34, and thus occurrence of such a state where a difference in pressure is not sufficiently eliminated is suppressed by the following action. This will be specifically described below.

According to the fluid valve 6 of this embodiment, when the lid body 41 of the valve seat 40 contacts with the restriction member 32 and thus opens the opening portion 14 of the valve plug 10, a fluid flows from the second pressure chamber 8 to the circulation path 11. Immediately after valve opening, an amount of opening of the first flow path 37 is small, and thus the fluid that has flowed to the circulation path 11 is accumulated in the pressure reservoir 34. Then, a pressure in the pressure reservoir 34 (a pressure in the space S and the circulation path 11) rises and becomes larger than a pressure in the first pressure chamber 7. In this manner, there occurs a difference in pressure between inside and outside the pressure reservoir 34 in the first pressure chamber 7, as a result of which the valve plug 10 is pushed forcefully in the first direction DX1. That is, a rise in pressure in the pressure reservoir 34 promotes an increase in degree of opening of the valve plug 10. In this manner, a degree of opening of the opening portion 14 of the valve plug 10 is increased, and thus a flow rate of a fluid flowing from the second pressure chamber 8 to the first pressure chamber 7 is increased, so that a difference in pressure is swiftly eliminated. Furthermore, since a degree of opening of the opening portion 14 of the valve plug 10 is increased, a length of time from valve opening to valve closing is also increased, and thus a difference in pressure is sufficiently eliminated, so that occurrence of chattering is suppressed.

The above-described fluid valve 6 exerts the following effects.

(1) The fluid valve 6 has the valve plug 10 configured as follows. In order to control a flow rate of a fluid between the first pressure chamber 7 and the second pressure chamber 8, the valve plug 10 is provided in the housing 20 so as to open/close the opening portion 14 of the valve plug 10 in accordance with a difference between forces generated by pressures in the pressure chambers 7 and 8 and resilience of the first elastic member 31. The fluid valve 6 further includes the opening motion promoting portion 33. The opening motion promoting portion 33 promotes an increase in degree of opening of the valve plug 10 after the valve plug 10 has been opened.

According to this configuration, in the valve plug 10 that is passively opened/closed under a relationship between a difference between forces generated respectively based on the first pressure and the second pressure and resilience of the first elastic member 31 such as a coil spring, even when a difference in pressure between the pressure chambers is decreased due to opening of the valve plug 10, the opening motion promoting portion 33 operates to promptly open the valve plug 10 to a required degree. Thus, it is possible to promptly eliminate a pressure difference between a pressure in one of pressure chambers and a pressure in the other pressure chamber.

(2) The opening motion promoting portion 33 applies, to the valve plug 10, a force in an opening direction of the valve plug 10 (the first direction DX1). According to this configuration, after the valve plug 10 has been opened, an additional force is applied in the opening direction of the valve plug 10, and thus the valve plug 10 is promptly opened to a required degree.

(3) The valve plug 10 has the circulation path 11. The circulation path 11 connects the first pressure chamber 7 to the second pressure chamber 8 and is closed by the valve seat 40. The opening motion promoting portion 33 has the pressure reservoir 34. The pressure reservoir 34 temporarily stores a fluid flowing into the circulation path 11 of the valve plug 10 so as to increase a pressure for pushing the valve plug 10.

According to this configuration, after the valve plug 10 has been opened, the fluid is accumulated in the pressure reservoir 34, thus increasing a pressure in the opening direction applied to the valve plug 10, so that a force acts on the valve plug 10 in a direction in which the valve plug 10 is separated from the valve seat 40 (the first direction DX1), namely, the opening direction of the valve plug 10. Thus, the valve plug 10 is promptly opened to a required degree. As described above, according to the foregoing configuration, it is possible to promptly open the valve plug 10 without using external power for operating the valve plug 10 of the fluid valve 6.

(4) The fluid valve 6 further includes the flow rate adjusting portion 36. The flow rate adjusting portion 36 restricts a flow rate of a fluid in a flow path through which the fluid flows out of the pressure reservoir 34. According to this configuration, after the valve plug 10 has been opened, a flow of a fluid flowing out of the pressure reservoir 34 is restricted by the flow rate adjusting portion 36, and thus it is possible to cause a rise in pressure in the pressure reservoir 34. As described above, compared with a case of using external power such as a force based on mechanical power or electromagnetism, a force for opening the valve plug 10 to a required degree can be generated using a simple configuration.

(5) In the fluid valve 6, the flow rate adjusting portion 36 lowers a pressure in the pressure reservoir 34 by relaxing restriction on the flow rate as the valve plug 10 is opened to a greater degree. Thus, after a degree of opening has been increased, it is possible to smooth a flow of a fluid from outside to inside the pressure reservoir 34 and thus to smoothly perform valve closing.

(6) In the fluid valve 6, the pressure reservoir 34 includes the inner wall 35. The inner wall 35 stores a fluid flowing from the second pressure chamber 8 near the valve seat 40 into the first pressure chamber 7 near the valve plug 10. The inner wall 35 includes the circumferential wall 28 and the movable wall 16. The circumferential wall 28 surrounds at least part of the valve plug 10. The movable wall 16 extends from the valve plug 10 and is disposed so as to overlap with the circumferential wall 28. Further, the flow rate adjusting portion 36 is provided in at least one of the circumferential wall 28 and the movable wall 16. According to this configuration, the pressure reservoir 34 and the flow rate adjusting portion 36 can be formed using a simple configuration.

(7) The flow rate adjusting portion 36 includes the first flow path 37 connecting between the inside and outside of the pressure reservoir 34. An amount of opening of the first flow path 37 is increased through movement of the movable wall 16 together with the valve plug 10 as a pressure in the pressure reservoir 34 rises. According to this configuration, a concise structure is used to expand the first flow path 37 through a rise in pressure in the pressure reservoir 34.

(8) The first flow path 37 is provided in at least one of the movable wall 16 and the circumferential wall 28 in a section in which the movable wall 16 and the circumferential wall 28 overlap with each other. In this embodiment, the first flow path 37 is provided in the movable wall 16. Further, an amount of opening of the first flow path 37 varies in accordance with relative movement between the movable wall 16 and the circumferential wall 28. As described above, in this embodiment, a concise structure is used to increase/decrease an amount of opening of the first flow path 37.

<Second Embodiment> With reference to FIG. 5 to FIG. 8, a description is given of a fluid valve 106 according to a second embodiment. The fluid valve 106 according to this embodiment is obtained by changing a structure of the flow rate adjusting portion 36 according to the first embodiment. The fluid valve 106 according to this embodiment will be described, with components having the same configurations as in the fluid valve 6 according to the first embodiment denoted by the same reference characters.

A flow rate adjusting portion 110 has a first configuration similar to that in the first embodiment and a second configuration unique to the second embodiment. In the first configuration, when the fluid flows from inside to outside a pressure reservoir 34 as a valve plug 10 is opened, a flow rate of a flow path of the pressure reservoir 34 is temporarily restricted. In the second configuration, when a fluid flows from outside to inside the pressure reservoir 34 as a valve seat 40 is opened, restriction on a flow rate in a flow path of the pressure reservoir 34 is relaxed.

The following describes one example of the flow rate adjusting portion 110.

The flow rate adjusting portion 110 includes a first flow path 111 and a second flow path 112. The first flow path 111 in effect has the same structure as that of the first flow path 37 shown in the first embodiment. The second flow path 112 is separate from the first flow path 111 and connects the inside and outside of the pressure reservoir 34.

An amount of opening of the first flow path 111 is increased through movement of a movable wall 120 together with the valve plug 10 as a pressure inside the pressure reservoir 34 rises. An amount of opening of the second flow path 112 is increased through movement of an after-mentioned moving body 130 together with the valve plug 10 as a pressure outside the pressure reservoir 34 rises.

Similarly to the embodiment, the flow rate adjusting portion 110 is provided in an inner wall 35 that is a component of the pressure reservoir 34. The inner wall 35 is composed of the movable wall 120 configured to move together with the valve plug 10 and a circumferential wall 28 provided at a partition wall 27. The flow rate adjusting portion 110 is provided in the movable wall 120. The movable wall 120 includes a movable wall main body portion 121 and the moving body 130 configured to move with respect to the movable wall main body portion 121.

The movable wall main body portion 121 includes a base portion 122 connected to the valve plug 10 and an extension portion 123 extending in a second direction DX2 from the base portion 122. A restriction surface 123a is provided at an end portion of the extension portion 123 in the second direction DX2 so as to contact with an end surface 28b of the circumferential wall 28. Moreover, a cutout portion 124 is provided at an end portion of the extension portion 123 in the second direction DX2. The cutout portion 124 is provided at at least one location in a circumferential direction around a center axis C of a housing 20.

The moving body 130 is disposed on an inner side of the movable wall main body portion 121 and the circumferential wall 28. The moving body 130 has a first overlapping portion 131 overlapping with the circumferential wall 28 and a second overlapping portion 132 overlapping with the extension portion 123 of the movable wall main body portion 121. The first overlapping portion 131 comes into sliding contact with an inner surface of the circumferential wall 28. The second overlapping portion 132 comes into sliding contact with an inner surface of the extension portion 123 of the movable wall main body portion 121.

A stepped portion 136 is provided on an outer surface of the moving body 130. A stepped surface 136a of the stepped portion 136 is perpendicular to the center axis C and faces a first direction DX1. In a direction along the center axis C, the stepped surface 136a is provided at a location overlapping with the first flow path 111 (which will be mentioned later).

The first overlapping portion 131 is disposed on a second direction DX2 side of the second overlapping portion 132. The moving body 130 is biased in the first direction DX1 by a third elastic member 140. The third elastic member 140 is, for example, a coil spring. Under a biasing force of the third elastic member 140, an end surface 130a of the moving body 130 in the first direction DX1 contacts with the base portion 122 of the movable wall 120. When the end surface 130a of the moving body 130 is in contact with the base portion 122 of the movable wall 120, a position of the moving body 130 with respect to the movable wall main body portion 121 is referred to as a "reference position." In a state of being disposed at the reference position with respect to the movable wall main body portion 121, the moving body 130 moves together with the movable wall main body portion 121. Furthermore, under a force in the second direction DX2 applied to the moving body 130, the moving body 130 may move in the second direction DX2 from the reference position with respect to the movable wall main body portion 121.

The first flow path 111 extends in a direction intersecting with the center axis C. The first flow path 111 is provided at a boundary portion 133 between the first overlapping portion 131 and the second overlapping portion 132. That is, in the moving body 130, the first flow path 111 is provided at a location where the stepped portion 136 is provided. One part of the first flow path 111 overlaps with the circumferential wall 28 of the partition wall 27. The other part of the first flow path 111 overlaps with the cutout portion 124. An amount of opening of the first flow path 111 is increased/decreased depending on a degree of overlapping between the first flow path 111 and the circumferential wall 28.

The second flow path 112 extends in the direction intersecting with the center axis C. The second flow path 112 is provided in the second overlapping portion 132. An amount of opening of the second flow path 112 is increased/decreased depending on a degree of overlapping between the second flow path 112 and the cutout portion 124.

When the moving body 130 is disposed at the reference position, a portion 135 between the first flow path 111 and the second flow path 112 overlaps with an intermediate portion of the cutout portion 124 in a center axis C direction. At this time, the cutout portion 124 overlaps with part of the first flow path 111 and also with part of the second flow path 112. At the time of valve closing, when the moving body 130 is disposed at the reference position, an amount of opening of the first flow path 111 and an amount of opening of the second flow path 112 are so small as to interfere with a fluid flowing from inside to outside the pressure reservoir 34.

Now, a description is given of a pressure applied to the moving body 130.

In the moving body 130, a pressure outside the pressure reservoir 34 may be applied to the stepped surface 136a of the second flow path 112.

At the time of valve closing, when the moving body 130 is disposed at the reference position, it is difficult for a fluid to flow from outside to inside the pressure reservoir 34. Because of this, when a pressure in a first pressure chamber 7 becomes high, there occurs a difference in pressure between inside and outside the pressure reservoir 34. Then, a pressure higher than a pressure inside the pressure reservoir 34 is applied to the stepped surface 136a of the second flow path 112, and thus the moving body 130 moves in the second direction DX2 from the reference position with respect to the movable wall main body portion 121. In this manner, an amount of opening of the second flow path 112 is increased through a rise in pressure in the first pressure chamber 7.

Figure 6:
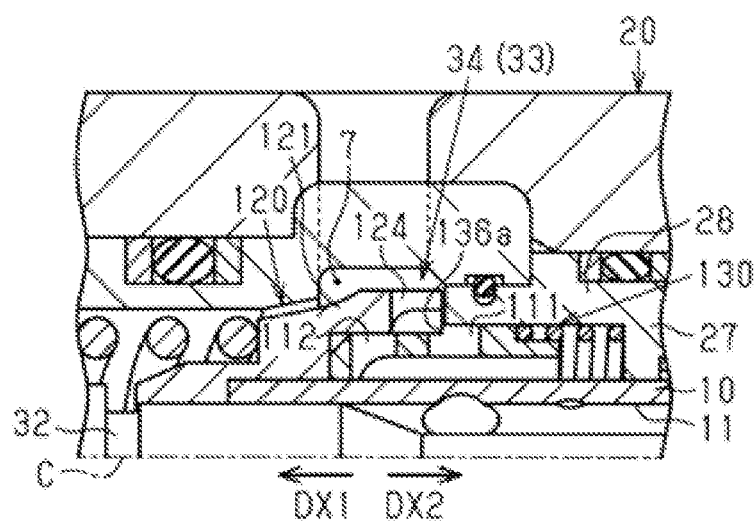
FIG. 6 is a partial sectional view of the fluid valve when closed in the second embodiment.
Figure 7:
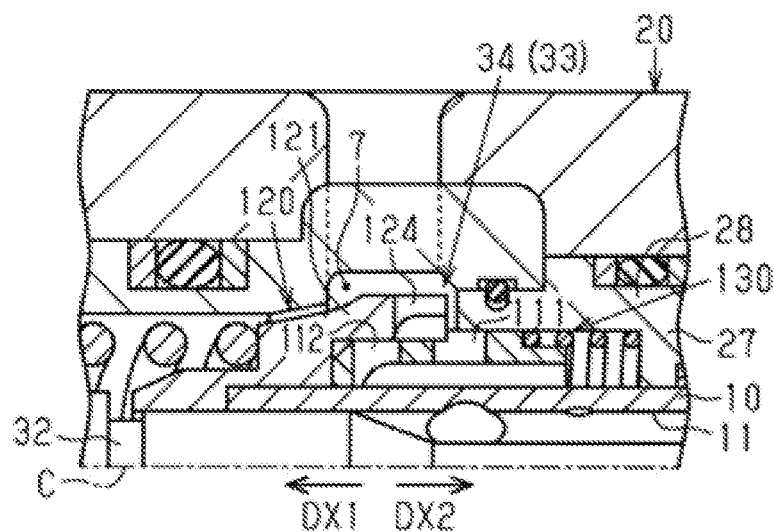
FIG. 7 is a partial sectional view of the fluid valve showing how the fluid valve is opened through movement of a valve plug in the second embodiment.
Figure 8:
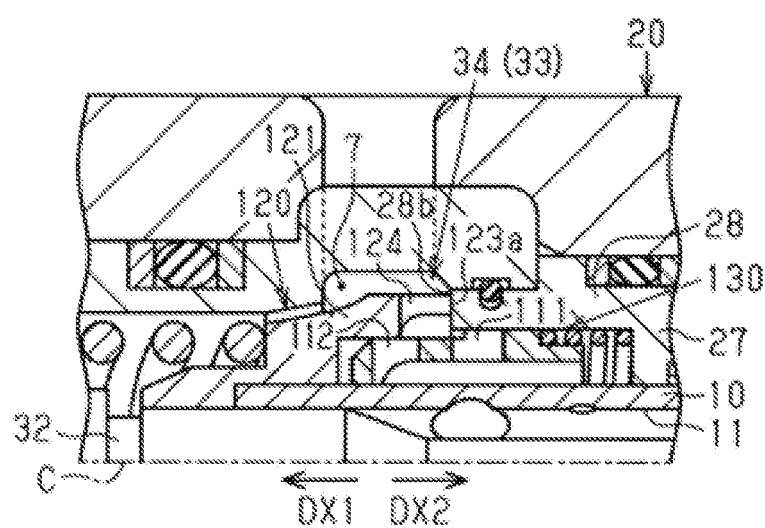
FIG. 8 is a partial sectional view of the fluid valve showing how the fluid valve is opened through movement of a valve seat in the second embodiment.

With reference to FIG. 6 to FIG. 8, a description is given of an operation of the fluid valve 106. FIG. 6 is a partial sectional view of the fluid valve 106 when closed.

When a pressure difference between a first pressure and a second pressure falls within a set range, an opening portion 14 of the valve plug 10 is closed by a lid body 41 of the valve seat 40. At this time, the restriction surface 123a (see FIG. 5) of the movable wall main body portion 121 is not in contact with the end surface 28b of the circumferential wall 28. Furthermore, the lid body 41 of the valve seat 40 is not in contact with a restriction member 32. The valve plug 10 and the valve seat 40 are at their respective equilibrium positions. At this time, the moving body 130 is disposed at the reference position.

FIG. 7 is a sectional view of the fluid valve 106 when opened through movement of the valve plug 10 in the first direction DX1.

When the second pressure becomes larger than the first pressure and a pressure difference between the first pressure and the second pressure exceeds a second set value, the valve plug 10 and the valve seat 40 move in the first direction DX1. When the valve seat 40 moves over a second predetermined distance from the equilibrium position, the lid body 41 contacts with the restriction member 32, and thus movement of the valve seat 40 is restricted. Movement of the valve plug 10 in the first direction DX1 is not restricted, and thus the valve plug 10 moves in the first direction DX1 for a longer distance than a moving distance of the valve seat 40. Thus, the opening portion 14 of the valve plug 10 is opened. When the opening portion 14 of the valve plug 10 is opened, by the same action as in the first embodiment, a pressure in the pressure reservoir 34 rises, and thus the valve plug 10 is pushed forcefully in the first direction DX1. Then, the movable wall 120 (the movable wall main body portion 121 and the moving body 130) moves together with the valve plug 10 in the first direction DX1, and thus an amount of opening of the first flow path 111 is increased. In this manner, a degree of opening of the opening portion 14 of the valve plug 10 is increased, and a flow rate of a fluid flowing from a second pressure chamber 8 to the first pressure chamber 7 is increased, so that a difference in pressure is swiftly eliminated.

FIG. 8 is a sectional view of the fluid valve 106 when opened through movement of the valve seat 40 in the second direction DX2.

When the first pressure becomes larger than the second pressure and a pressure difference between the first pressure and the second pressure exceeds a first set value, the valve plug 10 and the valve seat 40 move in the second direction DX2. When the valve plug 10 moves over a first predetermined distance from the equilibrium position, the restriction surface 123a of the movable wall main body portion 121 contacts with the end surface 28b of the circumferential wall 28, and thus movement of the valve plug 10 is restricted. Movement of the valve seat 40 in the second direction DX2 is not restricted, and thus the valve seat 40 moves in the second direction DX2 over a longer distance than a moving distance of the valve plug 10. Thus, the opening portion 14 of the valve plug 10 is opened, and a fluid flows from the first pressure chamber 7 to the second pressure chamber 8 via a circulation path 11, so that a difference in pressure is eliminated.

Regarding the valve seat 40 moving in the second direction DX2 so as to be opened, a detailed description is further given in comparison with a fluid valve 106 having a comparative structure.

The fluid valve 106 having the comparative structure is obtained by omitting the second flow path 112 from the fluid valve 106 of this embodiment.

In the fluid valve having the comparative structure, at the time of valve closing, a flow of a fluid from inside to outside a pressure reservoir 34 is restricted by the pressure reservoir 34. Accordingly, in effect, a flow of a fluid from outside to inside the pressure reservoir 34 is also restricted by the pressure reservoir 34. Because of this, when a first pressure rises, a fluid might not flow smoothly from a first pressure chamber 7 to a second pressure chamber 8.

In this regard, according to the fluid valve 106 according to this embodiment, when the first pressure rises, restriction on a flow of a fluid from outside to inside the pressure reservoir 34 is lifted Therefore, a fluid flows smoothly from the first pressure chamber 7 to the second pressure chamber 8. This will be specifically described below.

When the first pressure becomes larger than the second pressure and a pressure difference between the first pressure and the second pressure exceeds the first set value, the opening 14 of the valve plug 10 is opened as mentioned above. Thus, a pressure in the pressure reservoir 34 is lowered. At this point in time, an amount of opening of the second flow path 112 has not been changed since the time of valve closing, a flow of a fluid from outside to inside the pressure reservoir 34 is restricted. This brings about a state where a pressure inside the pressure reservoir 34 is lower than a pressure outside the pressure reservoir 34, so that a difference in pressure occurs. Then, based on this difference in pressure, a pressure higher than a pressure inside the pressure reservoir 34 is applied to the stepped surface 136a of the second flow path 112 as mentioned above, and thus the moving body 130 moves in the second direction DX2 with respect to the movable wall main body portion 121. As a result, a degree of overlapping between the cutout portion 124 and the second flow path 112 is increased, and thus an amount of opening of the second flow path 112 is increased. Thus, a flow rate of a fluid flowing to the second flow path 112 is increased, so that the fluid flows smoothly from the first pressure chamber 7 to the second pressure chamber 8 via the circulation path 11. In this manner, a flow rate of a fluid flowing from the first pressure chamber 7 to the second pressure chamber 8 is increased, and thus a difference in pressure is swiftly eliminated.

In addition to the effects obtained by the first embodiment, the fluid valve 106 according to this embodiment exerts the following effects.

(1) In the above-described fluid valve 106, each one of the valve plug 10 and the valve seat 40 is openable and closable with respect to the other. When a fluid flows from outside the pressure reservoir 34 into the pressure reservoir 34 as the valve seat 40 is opened, the flow rate adjusting portion 110 relaxes restriction on the flow rate in the flow path of the pressure reservoir 34.

According to this configuration, after the valve seat 40 has been opened (after valve opening caused by the valve seat 40 moving in the second direction DX2), by the flow rate adjusting portion 110, restriction on a flow rate in a flow path of the pressure reservoir 34 is relaxed, and thus it becomes easier for a fluid to flow from outside the pressure reservoir 34. Thus, after the valve seat 40 has been opened, a fluid flows smoothly.

(2) In the above-described fluid valve 106, the flow rate adjusting portion 110 includes the first flow path 111 and the second flow path 112 separate from the first flow path 111, the second flow path 112 connecting between the inside and outside of the pressure reservoir 34. Before the valve seat 40 is opened, an amount of opening of the second flow path 112 is set to such an amount as to restrict a flow rate of a fluid flowing to the pressure reservoir 34, and after the valve seat 40 has been opened, the amount of opening of the second flow path 112 is increased so as to relax restriction on the flow rate of the fluid flowing to the pressure reservoir 34. According to this configuration, after the valve seat 40 has been opened, it is possible to cause a fluid to flow smoothly to the pressure reservoir 34 via the second flow path 112.

(3) An amount of opening of the second flow path 112 is adjusted through movement of the moving body 130 including the second flow path 112. According to this configuration, a flow rate of a fluid flowing to the second flow path 112 is adjusted using a simple configuration.

Figure 9:
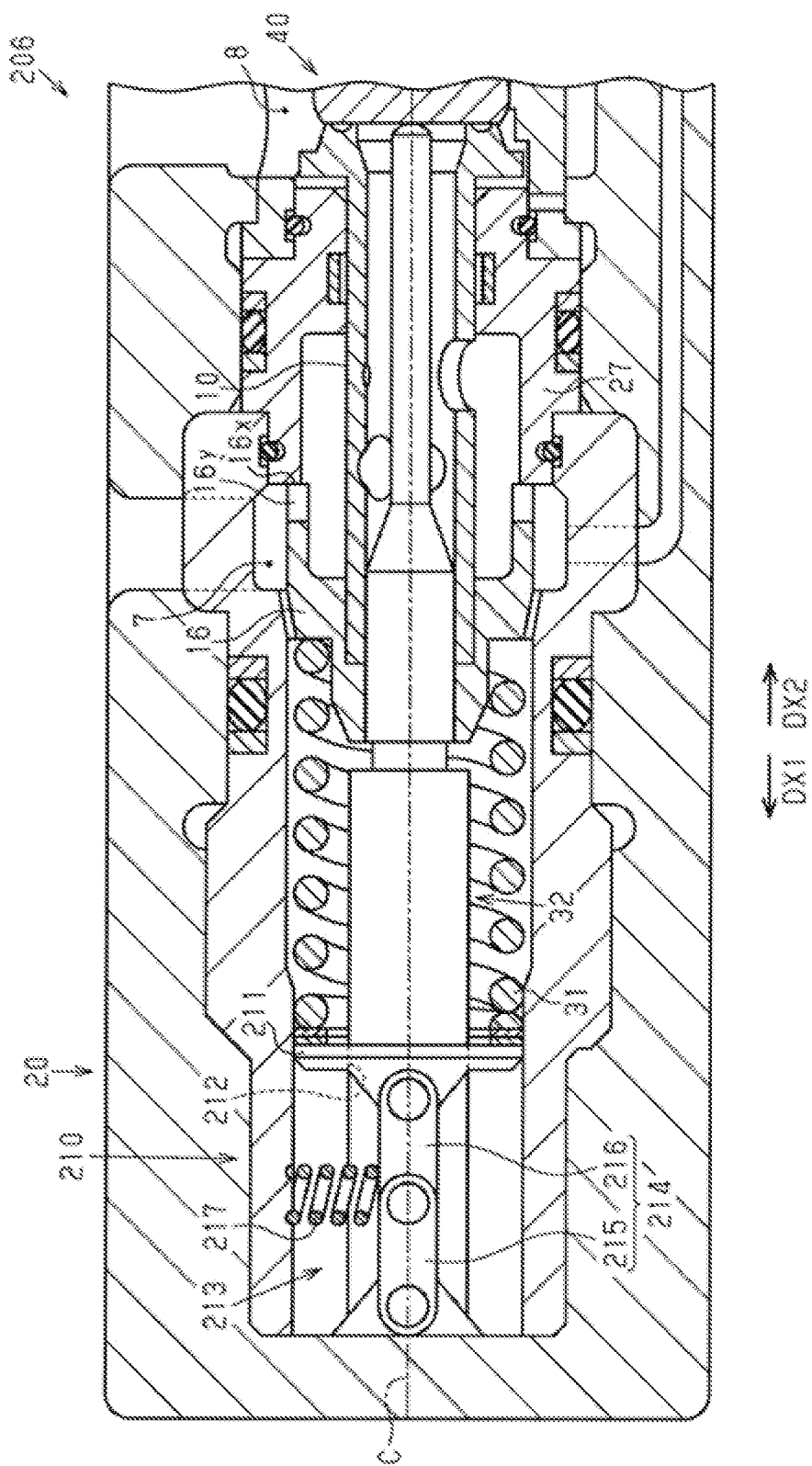
FIG. 9 is a partial sectional view of a fluid valve according to a third embodiment.

<Third Embodiment> With reference to FIG. 9, a description is given of a fluid valve 206 according to a third embodiment.

The fluid valve 206 according to this embodiment is obtained by changing a structure of the opening motion promoting portion 33 according to the first embodiment. The fluid valve 206 according to this embodiment will be described, with components having the same configurations as in the fluid valve 6 according to the first embodiment denoted by the same reference characters.

In the first embodiment, the opening motion promoting portion 33 is configured to include the pressure reservoir 34. The pressure reservoir 34 temporarily stores a fluid flowing into the circulation path 11 of the valve plug 10. As described above, the opening motion promoting portion 33 shown in the first embodiment uses a pressure of a fluid to form a force for promoting opening of the valve plug 10.

In this embodiment, an opening motion promoting portion 210 promotes opening of a valve plug 10 by controlling a force interfering with opening of the valve plug 10 (a biasing force of a first elastic member 31). The following describes the fluid valve 206 in terms of differences thereof from the first embodiment.

In this embodiment, the inner wall 35 may be omitted. A movable wall 16 is provided with a restriction surface 16x for restricting movement of the valve plug 10. In the movable wall 16, there is also provided a flow path 16y through which a fluid circulates.

The opening motion promoting portion 210 controls an elastic force of the first elastic member 31. The opening motion promoting portion 210 includes a platform portion 211 supporting the first elastic member 31 and a support portion 213 supporting the platform portion 211 so that the platform portion 211 is movable in a direction along a center axis C.

The platform portion 211 supports an end portion of the first elastic member 31 in a first direction DX1. The platform portion 211 has a through hole 212 provided therein, through which the restriction member 32 is passed. In order to prevent leakage of a fluid, sealing is provided between the through hole 212 and the restriction member 32. The support portion 213 has a toggle mechanism. The support portion 213 includes an arm 214 composed of a first arm 215 and a second arm 216 and a fourth elastic member 217 pushing a joint between the first arm 215 and the second arm 216. An end portion of the first arm 215 in the first direction DX1 is rotatably mounted to a housing 20. An end portion of the first arm 215 in a second direction DX2 and an end portion of the second arm 216 in the first direction DX1 are rotatably joined to each other. An end portion of the second arm 216 in the second direction DX2 is rotatably mounted to the platform portion 211. The fourth elastic member 217 pushes the joint between the first arm 215 and the second arm 216 so that the first arm 215 and the second arm 216 are straightened along the center axis C.

The support portion 213 operates in the following manner.

When a force applied to the platform portion 211 is equal to or less than a third set value, an angle formed between the first arm 215 and the second arm 216 is substantially 180 degrees, and thus the first arm 215 and the second arm 216 are arranged linearly along the center axis C. In this case, the first arm 215 and the second arm 216 do not rotate, and thus a position of the platform position 211 does not change in a center axis C direction. When a force applied to the platform portion 211 exceeds the third set value, the first arm 215 and the second arm 216 rotate to fold the arm 214, and thus the platform portion 211 moves in the first direction DX1. As described above, when a force applied to the platform portion 211 exceeds the third set value, the support portion 213 causes the platform portion 211 to move in the first direction DX1.

The third set value has been set to a value equal to the magnitude of a force applied to the platform portion 211 immediately before the start of valve opening through movement of the valve plug 10 in the first direction DX1. Thus, at the start of valve opening through movement of the valve plug 10, a force for supporting the platform portion 211 is reduced.

A description is given of an action of the fluid valve 206.

When a second pressure becomes larger than a first pressure and a pressure difference between the first pressure and the second pressure exceeds a second set value, the valve plug 10 moves in the first direction DX1 and thus is opened. At this time, a force applied to the platform portion 211 exceeds the third set value. Then, the arm 214 of the support portion 213 supporting the platform portion 211 is folded to cause the platform portion 211 to move in the first direction DX1. Thus, compression of the first elastic member 31 is relaxed, thus facilitating movement of the valve plug 10 in the first direction DX1, so that a degree of opening of the valve plug 10 is increased.

A description is given of effects of the fluid valve 206.

In the fluid valve 206, immediately after valve opening of the valve plug 10, the opening motion promoting portion 210 reduces an acting force of the first elastic member 31, the acting force acting to close the valve plug 10. According to this configuration, after the valve plug 10 has been opened, a force acting to close the valve plug 10 (a force based on the first elastic member 31, the force pushing the valve plug 10 in the second direction DX2) is weakened, and thus the valve plug 10 is promptly opened to a required degree.

Figure 10:
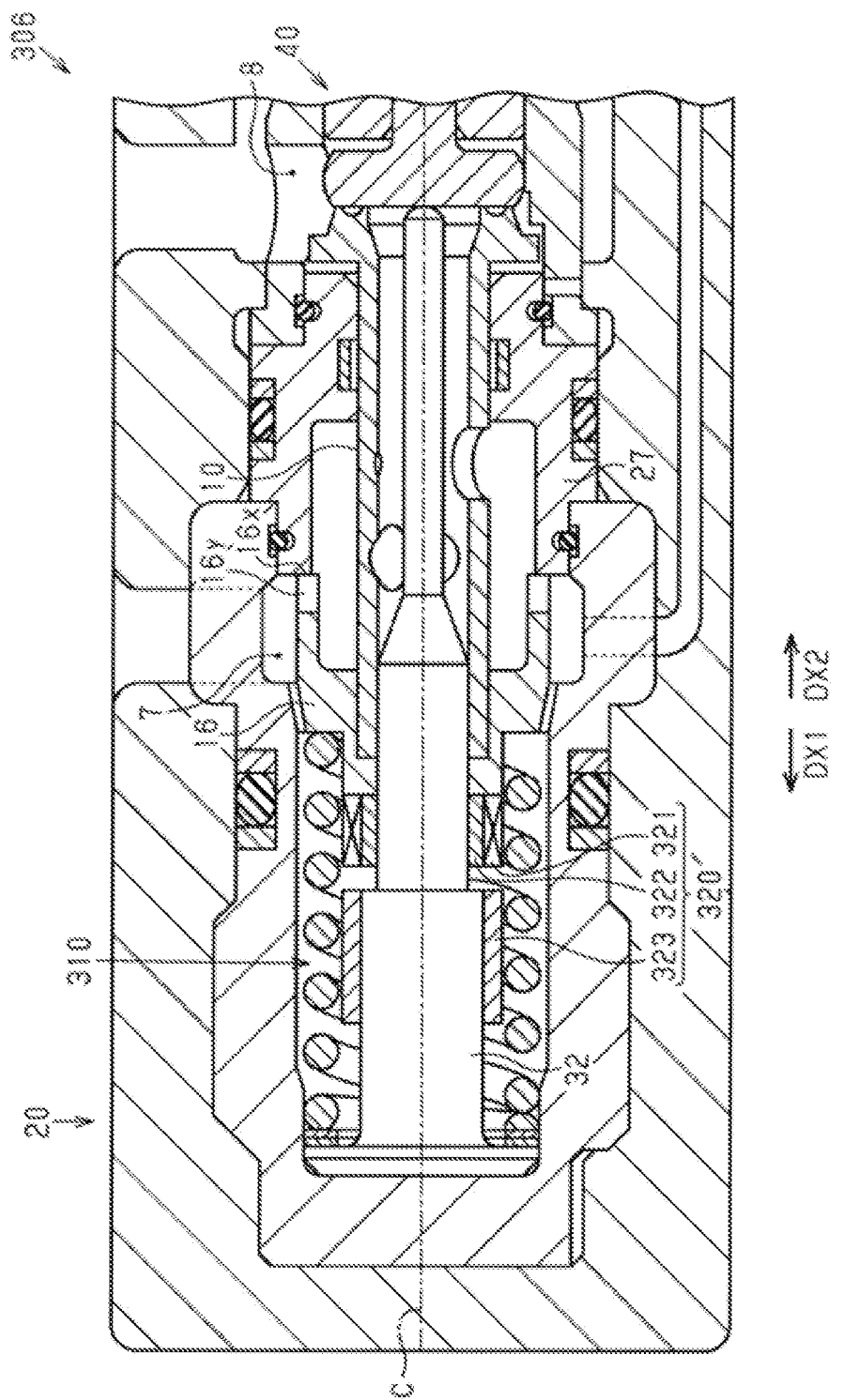
FIG. 10 is a partial sectional view of a fluid valve according to a fourth embodiment.

<Fourth Embodiment> With reference to FIG. 10, a description is given of a fluid valve 306 according to a fourth embodiment.

The fluid valve 306 according to this embodiment is obtained by changing a structure of the opening motion promoting portion 33 according to the first embodiment. The fluid valve 306 according to this embodiment will be described, with components having the same configurations as in the fluid valve 6 according to the first embodiment denoted by the same reference characters.

In the first embodiment, the opening motion promoting portion 33 is configured to include the pressure reservoir 34. The pressure reservoir 34 temporarily stores a fluid flowing into the circulation path 11 of the valve plug 10. As described above, the opening motion promoting portion 33 shown in the first embodiment uses a pressure of a fluid to form a force for promoting opening of the valve plug 10.

In this embodiment, an opening motion promoting portion 310 forms a force for promoting opening of a valve plug 10 by use of an electromagnetic force. The following describes the fluid valve 306 in terms of differences thereof from the first embodiment.

In this embodiment, the inner wall 35 may be omitted. A movable wall 16 is provided with a restriction surface 16x for restricting movement of the valve plug 10. In the movable wall 16, there is also provided a flow path 16y through which a fluid circulates.

The opening motion promoting portion 310 includes a sensor (not shown) for detecting that the valve plug 10 moves in a first direction DX1 and thus is opened, a solenoid 320, and a control portion (not shown) for controlling the solenoid 320. The solenoid 320 has a coil 321, an iron core 322, and a fixed magnetic pole 323 attracted to the iron core 322. The iron core 322 is mounted to an end portion of the movable wall 16 in the first direction DX1. The iron core 322 is configured in a circular cylindrical shape. The coil 321 is disposed around the iron core 322. The coil 321 is energized to magnetize the iron core 322. The fixed magnetic pole 323 is disposed on a first direction DX1 side of the iron core 322 and fixed to a restriction member 32.

The sensor detects a position of the valve plug 10. The sensor detects that the valve plug 10 has moved in the first direction DX1 and arrived at a valve opening position (a position reached immediately after valve opening). Upon detecting opening of the valve plug 10, the sensor outputs a detection signal to the control portion. Based on reception of this detection signal, the control portion energizes the coil 321. After a lapse of a predetermined length of time from an energization start time for starting energization of the coil 321, the control portion stops the energization.

A description is given of an action of the fluid valve 306.

When a second pressure becomes larger than a first pressure and a pressure difference between the first pressure and the second pressure exceeds a second set value, the valve plug 10 moves in the first direction DX1 and thus is opened. At this time, the sensor detects this valve opening. The control portion receives a detection signal from the sensor. Based on reception of the detection signal, the control portion energizes the coil 321. Then, the iron core 322 is magnetized to form a magnetic force, and a force directed to the fixed magnetic pole 323 (a force in the first direction DX1) acts on the iron core 322. This force causes the movable wall 16 and the valve plug 10 to move in the first direction DX1. In this manner, a degree of opening of the valve plug 10 is increased.

The fluid valve 306 exerts the following effects.

(1) The opening motion promoting portion 310 applies, to the valve plug 10, a force in an opening direction of the valve plug 10 by use of an electromagnetic force. According to this configuration, after the valve plug 10 has been opened, an additional force is applied in the opening direction of the valve plug 10, and thus the valve plug 10 is promptly opened to a required degree.

(2) The valve plug 10 has the iron core 322. After the valve plug 10 has been opened, the opening motion promoting portion 310 generates a force acting on the valve plug 10 in an opening direction of the valve plug 10 by use of the coil 321 disposed around the iron core 322. According to this configuration, by use of a force based on electromagnetism, a degree of opening of the valve plug 10 can be increased at any timing. Furthermore, a degree of opening of the valve plug 10 can be adjusted by controlling an amount of electric current to be passed through the coil 321.

Figure 11:
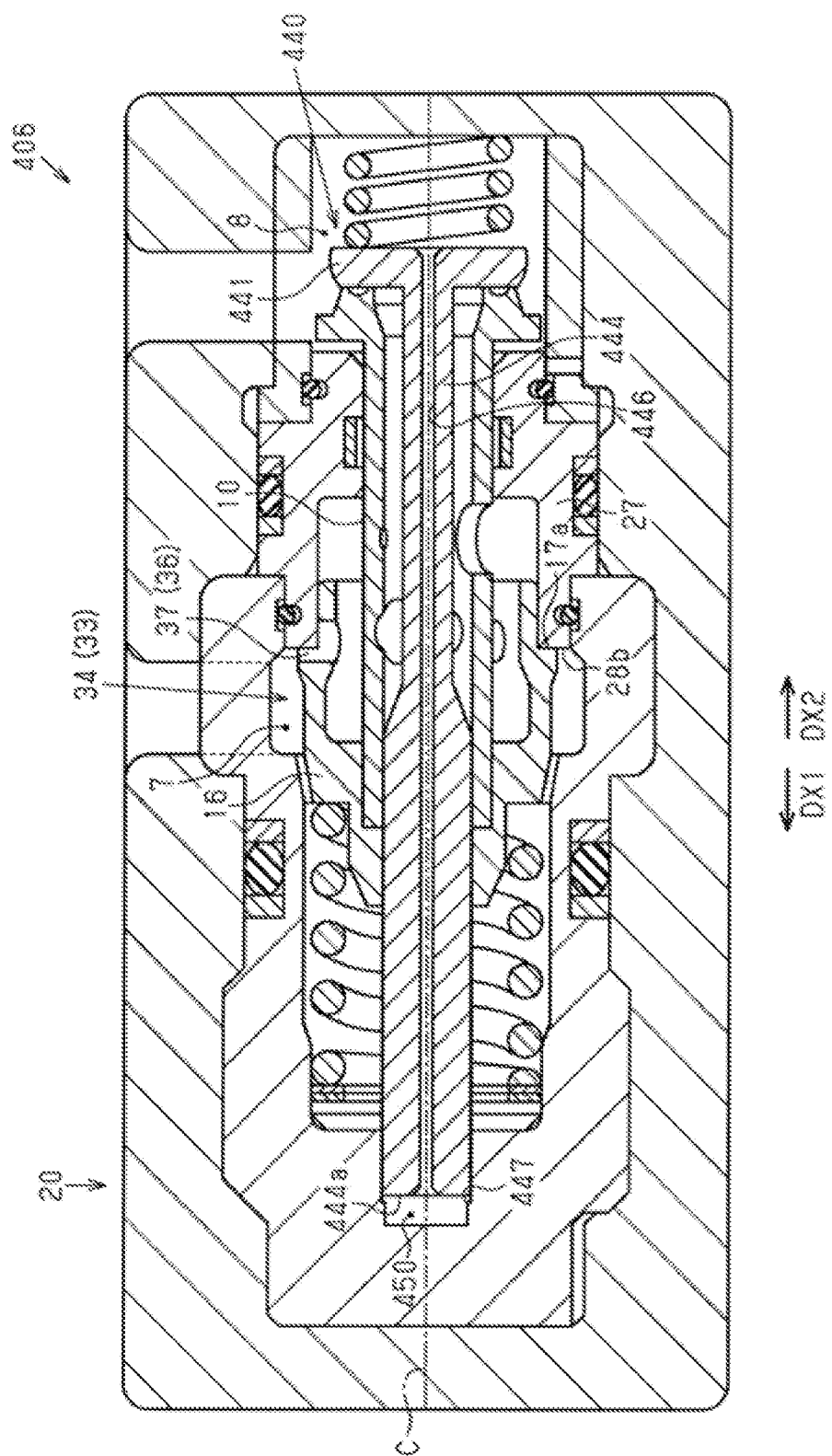
FIG. 11 is a sectional view of a fluid valve according to a fifth embodiment.

<Fifth Embodiment> With reference to FIG. 11, a description is given of a fluid valve 406 according to a fifth embodiment.

The fluid valve 406 according to this embodiment is obtained by changing a structure of the valve seat 40 according to the first embodiment. The fluid valve 406 according to this embodiment will be described, with components having the same configurations as in the fluid valve 6 according to the first embodiment denoted by the same reference characters.

In this embodiment, a valve seat 440 includes a lid body 441 and a support rod 444 supporting the lid body 441.

The support rod 444 is inserted through an inner portion of a valve plug 10. The valve plug 10 and a movable wall 16 slide with respect to the support rod 444. Furthermore, the support rod 444 has a through hole 446 provided to extend along a center axis C. The through hole 446 connects a second pressure chamber 8 to an after-mentioned fourth pressure chamber 450.

In a housing 20, there is provided the fourth pressure chamber 450 isolated from a first pressure chamber 7. In the fourth pressure chamber 450, an end surface 444a of the support rod 444 in a first direction DX1 is exposed. The fourth pressure chamber 450 is connected to the second pressure chamber 8 via the through hole 446. Accordingly, a pressure in the fourth pressure chamber 450 is equal to a pressure in the second pressure chamber 8. Furthermore, a restriction portion 447 for restricting movement of the valve seat 440 in the first direction DX1 is provided in the fourth pressure chamber 450.

A description is given of an operation of the fluid valve 406.

When a first pressure becomes larger than a second pressure and a pressure difference between the first pressure and the second pressure exceeds a first set value, the valve plug 10 and the valve seat 440 move in a second direction DX2. When the valve plug 10 moves over a first predetermined distance from an equilibrium position, a restriction surface 17a of the movable wall 16 contacts with an end surface 28b of a circumferential wall 28, and thus movement of the valve plug 10 is restricted. Movement of the valve seat 440 in the second direction DX2 is not restricted, and thus the valve seat 440 moves in the second direction DX2 over a longer distance than a moving distance of the valve plug 10. Thus, an opening portion 14 of the valve plug 10 is opened, and a fluid flows from the first pressure chamber 7 to the second pressure chamber 8, so that a difference in pressure is eliminated.

When the second pressure becomes larger than the first pressure and a pressure difference between the first pressure and the second pressure exceeds a second set value, the valve plug 10 and the valve seat 440 move in the first direction DX1. When the valve seat 440 moves over a second predetermined distance from an equilibrium position, the support rod 444 contacts with the restriction portion 447, and thus movement of the valve seat 440 is restricted. Movement of the valve plug 10 in the first direction DX1 is not restricted, and thus the valve plug 10 moves in the first direction DX1 over a longer distance than a moving distance of the valve seat 440. Thus, the opening portion 14 of the valve plug 10 is opened, and a fluid flows from the second pressure chamber 8 to the first pressure chamber 7, so that a difference in pressure is eliminated.

As described above, the fluid valve 406 according to this embodiment operates in the same manner as the fluid valve 6 according to the first embodiment. Accordingly, the fluid valve 406 according to this embodiment exerts effects according to the effects of the fluid valve 6 according to the first embodiment. For example, the fluid valve 406 according to this embodiment has a structure according to the opening motion promoting portion 33 shown in the first embodiment. Therefore, the fluid valve 406 exerts effects according to the effects of the opening motion promoting portion 33 shown in the first embodiment.

Figure 12:
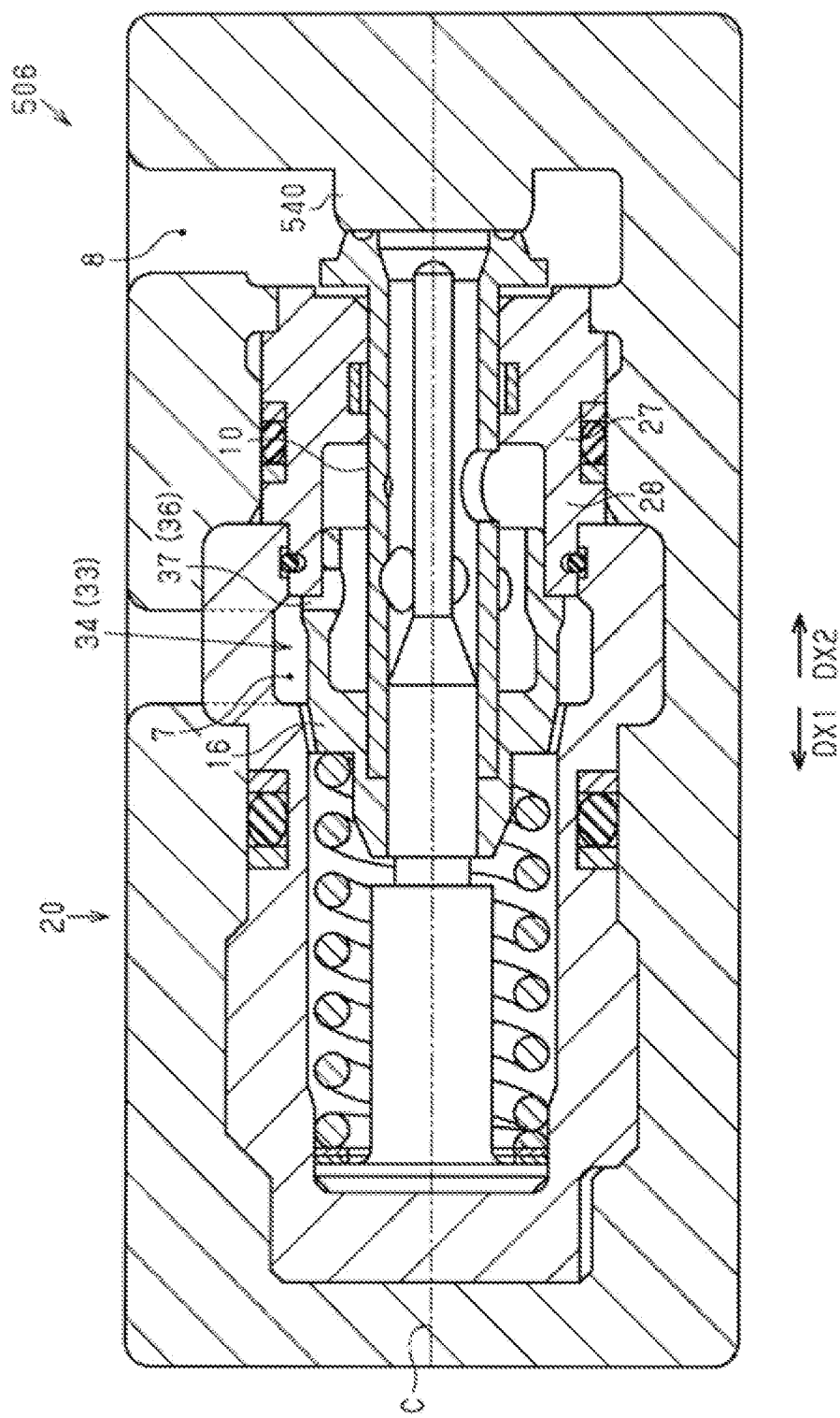
FIG. 12 is a sectional view of a fluid valve according to a sixth embodiment.

<Sixth Embodiment> With reference to FIG. 12, a description is given of a fluid valve 506 according to a sixth embodiment. The fluid valve 506 according to this embodiment is obtained by changing a structure of the valve seat 40 according to the first embodiment. The fluid valve 506 according to this embodiment will be described, with components having the same configurations as in the fluid valve 6 according to the first embodiment denoted by the same reference characters.

In the first embodiment, the valve seat 40 is movable with respect to the valve plug 10. On the other hand, in this embodiment, a valve seat 540 is fixed to a housing 20. A valve plug 10 in effect has the same structure as that in the first embodiment.

A description is given of an operation of the fluid valve 506.

When a second pressure becomes larger than a first pressure and a pressure difference between the first pressure and the second pressure exceeds a second set value, the valve plug 10 moves in a first direction DX1. When the valve plug 10 moves over a predetermined distance from an equilibrium position, an opening portion 14 of the valve plug 10 is opened, and a fluid flows from a second pressure chamber 8 to a first pressure chamber 7, so that a difference in pressure is eliminated. On the other hand, when the first pressure becomes larger than the second pressure, valve opening does not occur. That is, the fluid valve 506 of this embodiment is a one-way release valve for lowering a pressure in the second pressure chamber 8 when it becomes extremely large.

The fluid valve 506 for releasing a fluid in one direction as described above also exerts effects according to the effects of the fluid valve 6 according to the first embodiment. For example, the fluid valve 506 according to this embodiment has a structure according to the opening motion promoting portion 33 shown in the first embodiment. Therefore, the fluid valve 506 exerts effects according to the effects of the opening motion promoting portion 33 shown in the first embodiment.

<Variations> The fluid valve is not limited to the foregoing embodiments.

For example, the fluid valve may be modified as follows.

Figure 13:
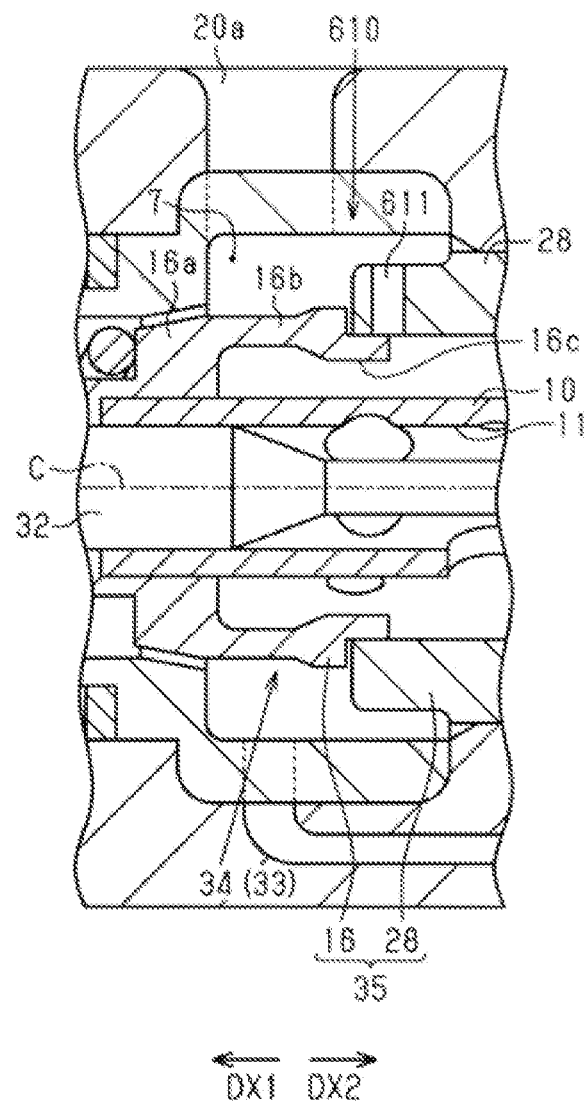
FIG. 13 is a partial sectional view of a fluid valve having a modification example of a flow rate adjusting portion.

With reference to FIG. 13, a description is given of a modification example of the flow rate adjusting portion 36 shown in the first embodiment. In the first embodiment, the first flow path 37 is configured as a hole penetrating the movable wall 16. On the other hand, a flow rate adjusting portion 610 of this embodiment includes a first flow path 611. The first flow path 611 is configured as a hole penetrating a circumferential wall 28 extending from a partition wall 27. The first flow path 611 overlaps with a movable wall 16 and thus is partly closed. An amount of opening of the first flow path 611 is adjusted as the movable wall 16 moves together with a valve plug 10.

The flow rate adjusting portion 36 shown in the first embodiment can be further modified as follows. It is also possible to provide a first flow path (not shown) in each of both the movable wall 16 and the circumferential wall 28. With a structure in which part of the first flow path in the movable wall 16 is blocked by the circumferential wall 28 and the first flow path in the circumferential wall 28 is blocked by the movable wall 16, an amount of opening of the first flow path 37 varies in accordance with relative movement between the movable wall 16 and the circumferential wall 28.

Figure 14:
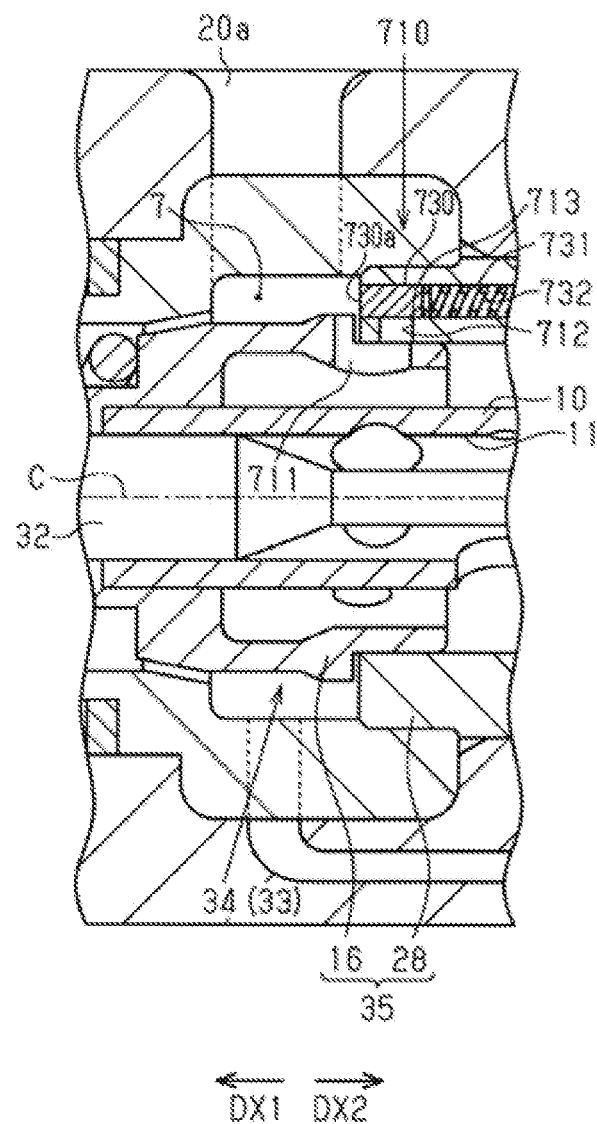
FIG. 14 is a partial sectional view of a fluid valve having a modification example of the flow rate adjusting portion.

With reference to FIG. 14, a description is given of a modification example of the flow rate adjusting portion 110 shown in the second embodiment. While in the second embodiment, the first flow path 111 and the second flow path 112 are configured in the moving body 130, it is possible in a flow rate adjusting portion 710 according to this embodiment that two flow paths are configured as follows.

As shown in FIG. 14, the flow rate adjusting portion 710 includes a first flow path 712 and a second flow path 712. Similarly to the first embodiment, the first flow path 711 is provided in a movable wall 16. The first flow path 711 is configured as a hole penetrating the movable wall 16. The second flow path 712 is configured as a hole penetrating a circumferential wall 28. The circumferential wall 28 has an outer surface and an inner surface. The second flow path 712 connects a space near the inner surface of the circumferential wall 28 to a space near the outer surface of the circumferential wall 28. While in FIG. 14, the second flow path 712 overlaps with part of the first flow path 711, the second flow path 712 may be provided at a location where it does not overlap with the first flow path 711.

An opening portion 713 of the second flow path 712 on an outer side is opened/closed by a moving body 730 configured to slide on the circumferential wall 28. An end surface 730a of the moving body 730 in a first direction DX1 is exposed to a first pressure chamber 7. The moving body 730 is biased in the first direction DX1 by a fifth elastic member 731. In the moving body 730, on a second direction DX2 side, there is provided an elastic member housing portion 732 slidably housing the moving body 730 and also housing the fifth elastic member 731. The elastic member housing portion 732 is connected to a second pressure chamber 8 via a passage (not shown). When a pressure difference between a first pressure and a second pressure falls within a set range, at least part of the opening portion 713 of the second flow path 712 is closed by the moving body 730. An amount of opening of the second flow path 712 is adjusted through movement of the moving body 730 closing at least part of the opening portion 713 of the second flow path 712.

Next, a description is given of an action of the flow rate adjusting portion 710.

When the second pressure becomes larger than the first pressure and a pressure difference between the first pressure and the second pressure exceeds a second set value, a valve plug 10 operates in the same manner as the valve plug 10 shown in the first embodiment.

When the first pressure becomes larger than the second pressure and a pressure difference between the first pressure and the second pressure exceeds a first set value, the moving body 730 moves in the second direction DX2 against a biasing force of the fifth elastic member 731. Then, the second flow path 712 is opened, and an amount of opening of the second flow path 712 is increased. Thus, a flow rate of a fluid flowing into the second flow path 712 is increased, and thus the fluid flows smoothly from the first pressure chamber 7 to the second pressure chamber 8. In this manner, a flow rate of a fluid flowing from the first pressure chamber 7 to the second pressure chamber 8 is increased, so that a difference in pressure is swiftly eliminated.

The fourth embodiment describes one example of an opening motion promoting portion using external power. That is, in the fourth embodiment (see FIG. 10), opening of the valve plug 10 is promoted by use of an electromagnetic force. Now, a description is given of another example of the opening motion promoting portion using external power.

Examples of external power include an actuator configured to operate by use of electric power or the like. For example, the actuator includes a ball screw mechanism for causing a valve plug 10 to move in a first direction DX1 and an electric motor for causing a ball screw to rotate. The valve plug 10 has a nut portion including a nut for receiving the ball screw fitted thereinto. The nut portion is provided at an end portion of the valve plug 10 in the first direction DX1. The ball screw rotates about a center axis C. The actuator further includes a sensor for detecting opening of the valve plug 10 based on the first direction DX1. When the sensor has detected valve opening, a control portion of the actuator drives the electric motor to cause the ball screw to rotate so that the valve plug 10 moves in the first direction DX1. Furthermore, preferably, a clutch is provided on a power transmission path from the electric motor to the ball screw. After the valve plug 10 has been sufficiently opened, the control portion causes the clutch to operate to disconnect the power transmission path between the electric motor and the ball screw. Thus, the valve plug 10 is closed smoothly. Furthermore, there is no limitation to the electric motor, and an ultrasonic motor may be adopted instead. Further, it is also possible to use a linear motor type actuator instead of the actuator using the ball screw mechanism.

The fluid valve described above exerts the following effects.

The opening motion promoting portion applies, to the valve plug 10, a force in an opening direction of the valve plug 10 by use of a force provided by the actuator. According to this configuration, after the valve plug 10 has been opened, an additional force is applied in the opening direction of the valve plug 10, and thus the valve plug 10 is promptly opened to a required degree.

After the valve plug 10 has been opened, the opening motion promoting portion generates a force acting on the valve plug 10 in an opening direction of the valve plug 10 by use of the actuator. Therefore, a degree of opening of the valve plug 10 can be increased at any timing.

While in each of the embodiments, the inner wall 35 of the pressure reservoir 34 is provided outside the valve plug 10, it is also possible to provide the inner wall 35 so that the inner wall 35 is in sliding contact with the valve plug 10. In this case, the first flow path of the flow rate adjusting portion 36 is configured by the through hole 13 of the valve plug 10. At least part of the first flow path described above overlaps with the inner wall 35, and thus an amount of opening of the first flow path (the through hole 13) is increased/decreased through movement of the valve plug 10. A pressure in the above-mentioned space S is increased by the pressure reservoir 34 as the second pressure becomes larger than the first pressure and is substantially equal to a pressure in a space in the circulation path 11. The pressure reservoir 34 configured as above has an action according to the action of the pressure reservoir 34 shown in the first embodiment.

The opening motion promoting portions 33, 210, and 310 shown in the embodiments each may be configured as a structural body incorporated into a component, a device, or a fluid valve. Herein, such opening motion promoting portions are collectively referred to as an "opening motion promoting device" (not shown).

Such an opening motion promoting device is mounted to or incorporated into a fluid valve having the following configuration. In order to control a flow rate of a fluid between a first pressure chamber 7 and a second pressure chamber 8, the fluid valve to which the opening motion promoting device is mounted includes a valve plug 10 provided so as to be openable and closable based on a difference between forces generated by a pressure in the first pressure chamber 7 and a pressure in the second pressure chamber 8 and resilience of a first elastic member 31. Further, the opening motion promoting device promotes an increase in degree of opening of the valve plug 10 after the valve plug 10 has been opened. Specifically, the opening motion promoting device in effect has a similar structure to that of any of the opening motion promoting portions 33, 210, and 310 shown in the foregoing embodiments.

According to this configuration, in the valve plug 10 that is passively opened/closed under a relationship between a difference between forces generated respectively by pressures and resilience of the first elastic member 31 such as a spring, even when a difference in pressure between the pressure chambers is decreased due to opening of the valve plug 10, the opening motion promoting device operates the valve plug 10 in its opening direction, and thus the valve plug 10 can be promptly opened to a required degree. Thus, it is possible to promptly eliminate a pressure difference between a pressure in one of pressure chambers and a pressure in the other pressure chamber.

More preferably, after the valve plug 10 has been opened, the opening motion promoting device generates a force acting on the valve plug 10 in an opening direction of the valve plug 10. According to this configuration, after the valve plug 10 has been opened, an additional force is applied to the valve plug 10 in the opening direction of the valve plug 10, and thus the valve plug 10 can be promptly opened to a required degree. In the opening motion promoting device, examples of how an additional force is applied to the valve plug 10 in the opening direction of the valve plug 10 include the use of a pressure as shown in the first embodiment and the second embodiment, the use of an electromagnetic force as shown in the fourth embodiment, and the use of power provided by the above-mentioned actuator.

As described in the foregoing embodiments and modification examples, at least the following techniques are disclosed.

A fluid valve for solving the above-described problem is a fluid valve including a valve plug provided so as to be openable and closable in accordance with a difference between forces generated by a pressure in a first pressure chamber and a pressure in a second pressure chamber and resilience of an elastic member, in order to control a flow rate of a fluid between the first pressure chamber and the second pressure chamber. The fluid valve includes an opening motion promoting portion for promoting an increase in degree of opening of the valve plug after the valve plug has been opened.

According to this configuration, in the valve plug that is passively opened/closed under a relationship between a difference between forces generated respectively by pressures and resilience of an elastic member such as a spring, even when a difference in pressure between the pressure chambers is decreased due to opening of the valve plug, the opening motion promoting portion operates to promptly open the valve plug to a required degree. Thus, it is possible to promptly eliminate a pressure difference between a pressure in one of pressure chambers and a pressure in the other pressure chamber.

In the above-described fluid valve, the opening motion promoting portion may apply, to the valve plug, a force in an opening direction of the valve plug. According to this configuration, after the valve plug has been opened, an additional force is applied in the opening direction of the valve plug, and thus the valve plug can be promptly opened to a required degree.

In the above-described fluid valve, it is possible that the valve plug includes a circulation path connecting the first pressure chamber to the second pressure chamber and configured to be closed by a valve seat, and the opening motion promoting portion includes a pressure reservoir for temporarily storing a fluid flowing into the circulation path of the valve plug so as to increase a pressure for pushing the valve plug.

According to this configuration, after the valve plug has been opened, a pressure in the opening direction applied to the valve plug is increased, so that a force acts on the valve plug in a direction in which the valve plug is separated from the valve seat, namely, the opening direction of the valve plug. Thus, the valve plug is promptly opened to a required degree. As described above, according to the foregoing configuration, it is possible to promptly open the valve plug without using external power for operating the valve plug of the fluid valve.

In the above-described fluid valve, there may be provided a flow rate adjusting portion for restricting a flow rate of the fluid in a flow path through which the fluid flows out of the pressure reservoir. According to this configuration, after the valve plug has been opened, a flow of a fluid flowing out of the pressure reservoir is restricted by the flow rate adjusting portion, and thus it is possible to cause a rise in pressure in the pressure reservoir. As described above, compared with a case of using external power, a force for opening the valve plug to a required degree can be generated using a simple configuration.

In the above-described fluid valve, the flow rate adjusting portion may lower a pressure in the pressure reservoir by relaxing restriction on the flow rate as the valve plug is opened to a greater degree. According to this configuration, the flow rate adjusting portion lowers a pressure in the pressure reservoir as the valve plug is opened to a greater degree. Thus, after a degree of opening has been increased, it is possible to smooth a flow of a fluid from outside to inside the pressure reservoir and thus to smoothly perform valve closing.

In the above-described fluid valve, it is possible that each one of the valve plug and the valve seat is openable and closable with respect to the other, and when a fluid flows into the pressure reservoir from outside the pressure reservoir as the valve seat is opened, the fluid rate adjusting portion relaxes restriction on the flow rate in the flow path of the pressure reservoir.

According to this configuration, after the valve seat has been opened, by the flow rate adjusting portion, restriction on a flow rate in a flow path of the pressure reservoir is relaxed, and thus it becomes easier for a fluid to flow from outside the pressure reservoir. Thus, after the valve seat has been opened, it is possible to cause a fluid to flow smoothly.

In the above-described fluid valve, it is possible that the pressure reservoir includes an inner wall for storing a fluid flowing from a pressure chamber near the valve seat into a pressure chamber near the valve plug, the inner wall including a circumferential wall surrounding at least part of the valve plug and a movable wall extending from the valve plug and disposed so as to overlap with the circumferential wall, and the flow rate adjusting portion is provided in at least one of the circumferential wall and the movable wall. According to this configuration, the pressure reservoir and the flow rate adjusting portion can be formed using a simple configuration.

In the above-described fluid valve, it is possible that the flow rate adjusting portion includes a first flow path connecting between the inside and outside of the pressure reservoir, and an amount of opening of the first flow path is increased through movement of the movable wall together with the valve plug as a pressure in the pressure reservoir rises. According to this configuration, a structure for expanding the first flow path through a rise in pressure in the pressure reservoir can be constructed using a simple configuration.

In the above-described fluid valve, it is possible that the first flow path is provided in at least one of the movable wall and the circumferential wall in a section in which the movable wall and the circumferential wall overlap with each other, and the amount of opening varies in accordance with relative movement between the movable wall and the circumferential wall. According to this configuration, a structure for increasing/decreasing an amount of opening of the first flow path can be constructed using a simple configuration.

In the above-described fluid valve, it is possible that the flow rate adjusting portion includes the first flow path and a second flow path separate from the first flow path, the second flow path connecting between the inside and outside of the pressure reservoir, and before the valve seat is opened, an amount of opening of the second flow path is set to such an amount as to restrict a flow rate of a fluid flowing to the pressure reservoir, and after the valve seat has been opened, the amount of opening of the second flow path is increased so as to relax restriction on the flow rate of the fluid flowing to the pressure reservoir. According to this configuration, after the valve seat has been opened, it is possible to cause a fluid to flow smoothly to the pressure reservoir via the second flow path.

In the above-described fluid valve, the amount of opening of the second flow path may be adjusted through movement of a moving body including the second flow path or through movement of a moving body closing at least part of the second flow path. According to this configuration, a flow rate of a fluid flowing through the second flow path can be adjusted using a simple configuration.

In the above-described fluid valve, it is possible that the valve plug includes an iron core, and after the valve plug has been opened, the opening motion promoting portion generates a force by use of a coil disposed around the iron core, the force acting on the valve plug in the opening direction of the valve plug. According to this configuration, by use of a force based on electromagnetism, a degree of opening of the valve plug can be increased at any timing.

It is possible that the above-described fluid valve further includes an actuator for causing the valve plug to move, and after the valve plug has been opened, the opening motion promoting portion generates a force by use of the actuator, the force acting on the valve plug in the opening direction of the valve plug. According to this configuration, by a mechanical operation, a degree of opening of the valve plug can be increased at any timing.

In the above-described fluid valve, the opening motion promoting portion may reduce an acting force of the elastic member, the acting force acting to close the valve plug. According to this configuration, after the valve plug has been opened, a force for closing the valve plug is weakened, and thus the valve plug can be promptly opened to a required degree.

An opening motion promoting device for solving the above-described problem is an opening motion promoting device for promoting opening of a valve plug included in a fluid valve, the fluid plug being provided so as to be openable and closable in accordance with a difference between forces generated by a pressure in a first pressure chamber and a pressure in a second pressure chamber and resilience of an elastic member, in order to control a flow rate of a fluid between the first pressure chamber and the second pressure chamber. The opening motion promoting device promotes an increase in degree of opening of the valve plug after the valve plug has been opened.

According to this configuration, in the valve plug that is passively opened/closed under a relationship between a difference between forces generated respectively by pressures and resilience of the elastic member such as a spring, even when a difference in pressure between the pressure chambers is decreased due to opening of the valve plug, the opening motion promoting device causes the valve plug to operate in its opening direction, and thus the valve plug can be promptly opened to a required degree. Thus, it is possible to promptly eliminate a pressure difference between a pressure in one of pressure chambers and a pressure in the other pressure chamber.

In the above-described opening motion promoting device, after the valve plug has been opened, there may be generated a force acting on the valve plug in an opening direction of the valve plug. According to this configuration, after the valve plug has been opened, an additional force is applied to the valve plug in the opening direction of the valve plug, and thus the valve plug can be promptly opened to a required degree.

What is claimed is:
1. A fluid valve, comprising:
a valve plug provided so as to be openable and closable in accordance with a difference between forces generated by a pressure in a first pressure chamber and a pressure in a second pressure chamber and resilience of an elastic member, in order to control a flow rate of a fluid between the first pressure chamber and the second pressure chamber; and
an opening motion promoter configured to promote an increase in degree of opening of the valve plug after the valve plug has been opened,
wherein the opening motion promoter is configured to apply, to the valve plug, a force in an opening direction of the valve plug,
wherein the valve plug includes a circulation path connecting the first pressure chamber to the second pressure chamber, the circulation path being closed by a valve seat,
wherein the opening motion promoter includes a pressure reservoir configured to temporarily store a fluid flowing into the circulation path of the valve plug so as to increase a pressure for pushing the valve plug,
further comprising: a flow rate adjuster configured to restrict a flow rate of the fluid in a flow path through which the fluid flows out of the pressure reservoir,
wherein each one of the valve plug and the valve seat is openable and closable with respect to the other, and
wherein, when the fluid flows from outside the pressure reservoir into the pressure reservoir as the valve seat is opened, the flow rate adjuster relaxes restriction on the flow rate in the flow path of the pressure reservoir, wherein the pressure reservoir includes an inner wall for storing the fluid flowing from the second pressure chamber near the valve seat into the first pressure chamber near the valve plug, wherein the inner wall includes:
- a circumferential wall surrounding at least part of the valve plug; and
- a movable wall extending from the valve plug and disposed so as to overlap with the circumferential wall, and wherein the flow rate adjuster is provided in at least one of the circumferential wall and the movable wall.

2. The fluid valve according to claim 1, wherein the flow rate adjuster is configured and arranged to lower a pressure in the pressure reservoir by relaxing restriction on the flow rate as the valve plug is opened to a greater degree.

3. The fluid valve according to claim 1, wherein the flow rate adjuster includes a first flow path connecting between an inside and outside of the pressure reservoir, and
wherein an amount of opening of the first flow path is increased through movement of the movable wall together with the valve plug as a pressure in the pressure reservoir rises.

4. The fluid valve according to claim 3, wherein the first flow path is provided in at least one of the movable wall and the circumferential wall in a section in which the movable wall and the circumferential wall overlap with each other, and
wherein the amount of opening varies in accordance with relative movement between the movable wall and the circumferential wall.

5. The fluid valve according to claim 3, wherein the flow rate adjuster includes:
the first flow path; and
a second flow path separate from the first flow path, the second flow path connecting between an inside and outside of the pressure reservoir, and
wherein, before the valve seat is opened, an amount of opening of the second flow path is set to such an amount as to restrict a flow rate of a fluid flowing to the pressure reservoir, and
wherein, after the valve seat has been opened, the amount of opening of the second flow path is increased so as to relax restriction on the flow rate of the fluid flowing to the pressure reservoir.

6. The fluid valve according to claim 5, wherein the amount of opening of the second flow path is adjusted through movement of a moving body including the second flow path or through movement of the moving body closing at least part of the second flow path.

7. An opening motion promoter that promotes opening of a valve plug included in a fluid valve, the valve plug being provided so as to be openable and closable in accordance with a difference between forces generated by a pressure in a first pressure chamber and a pressure in a second pressure chamber and resilience of an elastic member, in order to control a flow rate of a fluid between the first pressure chamber and the second pressure chamber,
wherein the opening motion promoter configured to promote an increase in degree of opening of the valve plug after the valve plug has been opened,
wherein the opening motion promoter configured to apply, to the valve plug, a force in an opening direction of the valve plug,
wherein the valve plug includes a circulation path connecting the first pressure chamber to the second pressure chamber, the circulation path being closed by a valve seat,
wherein the opening motion promoter includes a pressure reservoir configured to temporarily store a fluid flowing into the circulation path of the valve plug so as to increase a pressure for pushing the valve plug,
further comprising: a flow rate adjuster configured to restrict a flow rate of the fluid in a flow path through which the fluid flows out of the pressure reservoir,
wherein each one of the valve plug and the valve seat is openable and closable with respect to the other, and
wherein, when the fluid flows from outside the pressure reservoir into the pressure reservoir as the valve seat is opened, the flow rate adjuster relaxes restriction on the flow rate in the flow path of the pressure reservoir,
wherein the pressure reservoir includes an inner wall for storing the fluid flowing from the second pressure chamber near the valve seat into the first pressure chamber near the valve plug,
wherein the inner wall includes:
- a circumferential wall surrounding at least part of the valve plug; and
- a movable wall extending from the valve plug and disposed so as to overlap with the circumferential wall, and wherein the flow rate adjuster is provided in at least one of the circumferential wall and the movable wall.

8. The opening motion promoting device according to claim 7, wherein, after the valve plug has been opened, the opening motion promoter generates the force acting on the valve plug in the opening direction of the valve plug.

* * * * *